United States Patent
Miyata et al.

(10) Patent No.: US 7,508,826 B2
(45) Date of Patent: Mar. 24, 2009

(54) ADDRESS TRANSLATING PROGRAM, ADDRESS TRANSLATING METHOD, AND ADDRESS TRANSLATING APPARATUS

(75) Inventors: Kaori Miyata, Kawasaki (JP); Tetsuya Harada, Kawasaki (JP); Ichiro Suzuki, Kawasaki (JP); Hideki Saito, Kawasaki (JP); Yoichiro Tsujii, Kawasaki (JP)

(73) Assignee: Fujitsu Limited, Nakahara-Ku, Kawasaki-Shi, Kanagawa (JP)

( * ) Notice: Subject to any disclaimer, the term of this patent is extended or adjusted under 35 U.S.C. 154(b) by 923 days.

(21) Appl. No.: 10/826,768

(22) Filed: Apr. 16, 2004

(65) Prior Publication Data
US 2005/0002406 A1 Jan. 6, 2005

(30) Foreign Application Priority Data
Jul. 1, 2003 (JP) ............................. 2003-189472

(51) Int. Cl.
*H04L 12/56* (2006.01)
*G06F 15/16* (2006.01)
(52) U.S. Cl. ....................... 370/389; 370/401; 709/203; 709/245
(58) Field of Classification Search ........................ None
See application file for complete search history.

(56) References Cited

U.S. PATENT DOCUMENTS

| | | | |
|---|---|---|---|
| 7,123,613 B1* | 10/2006 | Chawla et al. | 370/389 |
| 7,136,359 B1* | 11/2006 | Coile et al. | 370/248 |
| 7,149,222 B2* | 12/2006 | Wiryaman et al. | 370/401 |
| 7,318,100 B2* | 1/2008 | Demmer et al. | 709/229 |
| 2001/0030970 A1* | 10/2001 | Wiryaman et al. | 370/401 |
| 2002/0035639 A1* | 3/2002 | Xu | 709/238 |
| 2002/0046252 A1 | 4/2002 | Ono et al. | |
| 2003/0026258 A1 | 2/2003 | Takatani et al. | |
| 2005/0021963 A1* | 1/2005 | Tomkow | 713/171 |
| 2005/0091341 A1* | 4/2005 | Knight et al. | 709/218 |
| 2007/0005765 A1* | 1/2007 | Lamb et al. | 709/225 |
| 2007/0115993 A1* | 5/2007 | Cohen | 370/392 |
| 2007/0214262 A1* | 9/2007 | Buchbinder et al. | 709/224 |

FOREIGN PATENT DOCUMENTS

| | | |
|---|---|---|
| JP | A 2002-125001 | 4/2002 |
| JP | A 2003-69615 | 3/2003 |

* cited by examiner

*Primary Examiner*—Wing F Chan
*Assistant Examiner*—Robert C Scheibel
(74) *Attorney, Agent, or Firm*—Fujitsu Patent Center

(57) ABSTRACT

An address translating program enables a server to identify the addresses of clients without the need for any special processing on the side of the server. When a computer receives a request packet, which has a source address translated into the address of a proxy server, output from a client to a server, via the proxy server, the computer analyzes contents of the request packet to acquire the address of the client. Then, the computer translates the source address of the request packet into the acquired address of the client and transmits the request packet to the server. Then, when the computer receives a response packet in response to the request packet from the server, the computer translates a destination address of the response packet from the address of the client into the address of the proxy server, and transmits the response packet to the proxy server.

8 Claims, 28 Drawing Sheets

ADDRESS TRANSLATION OF REQUEST PACKET

151a

| ITEM NO. | SOURCE ADDRESS TO BE TRANSLATED | SOURCE ADDRESS TRANSLATED |
|---|---|---|
| 1 | PROXY#1 | CL#1 |
| 2 | PROXY#2 | CL#3 |
| | | |

FIG. 12

| ITEM NO. | SOURCE ADDRESS TO BE TRANSLATED | SOURCE ADDRESS TRANSLATED |
|---|---|---|
| 1 | PROXY#1 | CL#1 |
| 2 | PROXY#2 | CL#3 |
| 3 | PROXY#1 | CL#2 |
| | | |

| ITEM NO. | SOURCE ADDRESS TO BE TRANSLATED | SOURCE COMMUNICATION IDENTIFIER TO BE TRANSLATED | SOURCE ADDRESS TRANSLATED | SOURCE COMMUNICATION IDENTIFIER TRANSLATED |
|---|---|---|---|---|
| 1 | PROXY#1 | PORT#1 | CL#1 | PORT#a |
| 2 | PROXY#2 | PORT#1 | CL#1 | PORT#b |
|  |  |  |  |  |

ADDRESS TRANSLATING PROGRAM, ADDRESS TRANSLATING METHOD, AND ADDRESS TRANSLATING APPARATUS

BACKGROUND OF THE INVENTION

1. Field of the Invention

The present invention relates to an address translating program, an address translating method, and an address translating apparatus which are applied to client-server communications, and more particularly to an address translating program, an address translating method, and an address translating apparatus for translating the addresses of packets transmitted and received via a proxy server.

2. Description of the Related Art

Generally a proxy server is placed between an in-office network and the Internet outside the office. The proxy server relays packets that are transmitted and received between a client on the in-office network and a server on the Internet. A packet that is sent to the Internet is given the IP (Internet Protocol) address of the proxy server as a source address.

When the client gains access through the proxy server, it is possible to conceal the IP address of the client machine from the server. Therefore, the proxy server is installed to ensure security at the time the client is connected to the Internet.

FIG. 27 of the accompanying drawings shows in block diagram a first example of a communication session via a conventional proxy server. As shown in FIG. 27, when an attempt is made by a client 911 to access a server 913 via a proxy server 912, the IP address of the client 911 is set as a source address in a first zone between the client 911 and the proxy server 912. The IP address of the proxy server 912 is set as a destination address in the first zone. In a second zone between the proxy server 912 and the server 913, the IP address of the proxy server 912 is set as a source address. The IP address of the server 913 is set as a destination address in the second zone. In this manner, the IP address of the client 911 is concealed from the server 913.

The proxy server 912 is also used for caching application data and centralizing authentication, in addition to ensuring security for Internet connections. The proxy server 912 is also used for those purposes when access is made to a server on an intranet. When a server on an intranet is accessed, the server 913 recognizes the IP address of the client 911 for access control, contents control, and session management, and also reads the IP address into the log for grasping an accessing situation. For accessing a server on an intranet, therefore, it is desirable to inform the server 913 of the IP address of the client 911, rather than concealing the IP address of the client 911 as when accessing the Internet.

However, when the server 913 is accessed via the proxy server 912, the source address that is sent to the server 913 is the IP address of the proxy server 912, not the IP address of the client 911. Therefore, the server 913 is unable to recognize the IP address of the client 911.

For this reason, some proxy servers have a function to store the IP address of the client 911 in application data and send the application data to the proxy server 913. The proxy server 913 analyzes the IP address of the client 911 in the application data, and uses it for access control, etc. According to the HTTP (HyperText Transfer Protocol), the IP address of the client 911 is stored in the application data, using an HTTP header (e.g., X-Client-IP header or X-Forwarded-For).

FIG. 28 of the accompanying drawings shows in block diagram a second example of a communication session via a conventional proxy server. As shown in FIG. 28, when an attempt is made by a client 911 to access a server 913 via a proxy server 912, the IP address of the client 911 is set as a source address in a first zone between the client 911 and the proxy server 912. The IP address of the proxy server 912 is set as a destination address in the first zone. In a second zone between the proxy server 912 and the server 913, the IP address of the proxy server 912 is set as a source address. The IP address of the server 913 is set as a destination address in the second zone.

When a packet is transmitted in the second zone, the proxy server 912 stores the IP address of the client 911 in the X-Client-IP header and sends it to the server 913. The server 913 can recognize the IP address of the client 911 by analyzing the X-Client-IP header in the HTTP header.

If packet filtering is performed by the proxy server 912, then it is possible for the proxy server 912 to guard against an attack that is made from the outside (the second zone in FIGS. 27 and 28) on the inside (the first zone in FIGS. 27 and 28) (see "Building Internet Firewalls 2nd Edition <VOLUME1>—Theory and Practice" written by Elizabeth D. Zwicky, Simon Cooper, D. Brent Chapman, published by O' Reilly Japan, Dec. 25, 2002, p. 122-127, p. 179-183).

In order for the server 913 to recognize the IP address of the client 911 when an access is made via the proxy server 912, the server 913 needs to analyze the application data and read the IP address of the client 911 that is stored in the application data. Since the server 913 also receives packets that are transmitted not via the proxy server 912, it is necessary for the server 913 to identify and separately process an access that is made via the proxy server 912 and an access that is made not via the proxy server 912.

However, because the administrators of many servers that exist on the Internet are different from each other, it is difficult to install the above identifying and processing capability in all the servers on the Internet.

SUMMARY OF THE INVENTION

It is therefore an object of the present invention to provide an address translating program, an address translating method, and an address translating apparatus for enabling a server to identify the addresses of clients without the need for any special processing on the side of the server.

To achieve the above object, there is provided in accordance with the present invention a address translating program for translating an address of a packet transmitted and received between a client and a server which are connected to each other through a proxy server. The address translating program enables a computer to perform a process of receiving a request packet, which has a source address translated into the address of the proxy server, output from the client to the server via the proxy server, and analyzing contents of the request packet to acquire the address of the client, translating the source address of the request packet into the acquired address of the client and transmitting the request packet to the server, and receiving a response packet in response to the request packet from the server, translating a destination address of the response packet from the address of the client into the address of the proxy server, and transmitting the response packet to the proxy server.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 12 is a diagram showing a data structure of a management table according to the second embodiment;

FIG. 17 is a diagram showing a management table after a record has been added thereto;

FIG. 20 is a diagram showing a data structure of a management table according to the third embodiment;

DESCRIPTION OF THE PREFERRED EMBODIMENTS

Preferred embodiments of the present invention will be described below in detail with reference to the drawings.

First, a brief summary of the present invention which is applied to the preferred embodiments thereof will be described below. Then, specific details of the embodiments of the present invention will be described.

Figure 1:
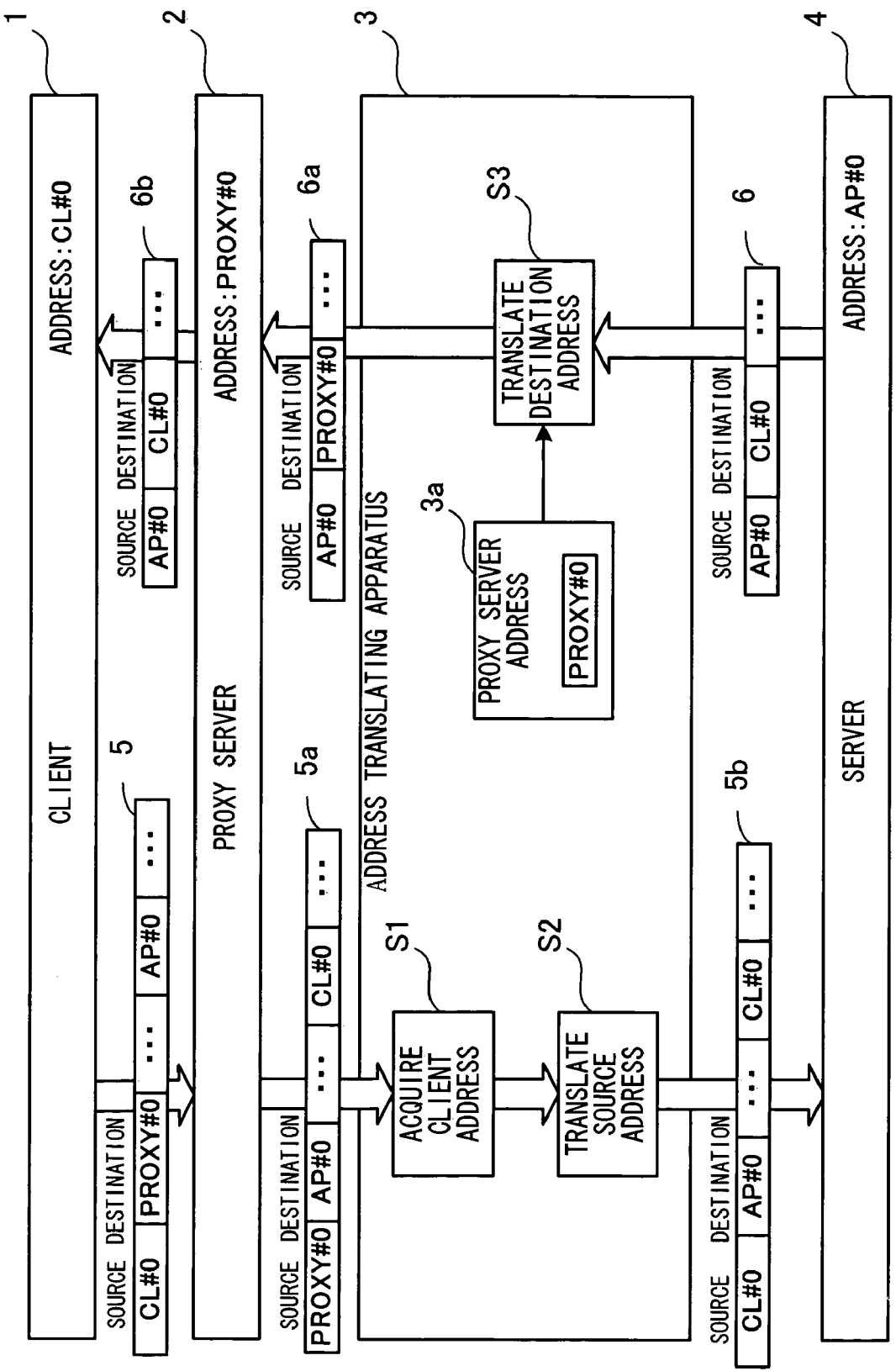
FIG. 1 is a block diagram showing the concept of the present invention which is incorporated in embodiments thereof.

FIG. 1 shows in block diagram the concept of the present invention which is incorporated in the embodiments thereof. In FIG. 1, the functions of the present invention are performed by an address translating apparatus 3. The address translating apparatus 3 is connected to a client 1 through a proxy server 2. The address translating apparatus 3 is also connected to a server 4. The client 1 is a computer which is allowed to access the server 4 only via the proxy server 2. The proxy server 2 is a computer for accessing the server 4 on behalf of the client 1. The address translating apparatus 3 is a computer for relaying packets that are input to and output from the server 4. The server 4 is a computer (e.g., an application server) for providing predetermined processing functions in response to a request from the client 1.

It is assumed that the client 1 has an address "CL#0", the proxy server 2 has an address "PROXY#0", and the server 4 has an address "AP#0". The address translating apparatus 3 stores the address 3a of the proxy server 2.

A request packet 5 which is sent from the client 1 to request processing by the server 4 is first transmitted to the proxy server 2. The request packet 5 has the address "CL#0" of the client 1 set as a source address and the address "PROXY#0" of the proxy server 2 set as a destination address. The address "AP#0" of the server 4 is also set in a predetermined area (e.g., an application header) of the request packet 5.

Having received the request packet 5, the proxy server 2 translates the source address of the request packet 5 from the address "CL#0" of the client 1 into the address "PROXY#0" of the proxy server 2, and sets the address "CL#0" of the client 1 in a predetermined area (e.g., the application header) of the request packet 5. The proxy server 2 transmits an address-translated request packet 5a to the address translating apparatus 3.

When the address translating apparatus 3 receives, via the proxy server 2, the request packet 5a whose source address has been translated into the address "PROXY#0" of the proxy server 2, the address translating apparatus 3 analyzes the contents of the request packet 5a and acquires the address "CL#0" of the client 1 (STEP S1). Then, the address translating apparatus 3 translates the source address of the request packet 5a into the acquired address "CL#0" of the client 1, and then transmits a translated request packet 5b to the server 4 (STEP S2).

In response to the request packet 5b, the server 4 performs a processing operation indicated by the request packet 5b, and outputs a response packet 6 based on the result of the processing operation. The response packet 6 has the address "AP#0" of the server 4 as a source address and the address "CL#0" of the client 1 as a destination address. The response packet 6 is transmitted to the address translating apparatus 3.

When the address translating apparatus 3 receives the response packet 6 responsive to the request packet 5b from the server 4, the address translating apparatus 3 translates the destination address of the response packet 6 from the address "CL#0" of the client 1 into the address "PROXY#0" of the proxy server 2. Then, the address translating apparatus 3 transmits an address-translated response packet 6a to the proxy server 2 (STEP S3).

Having received the response packet 6a, the proxy server 2 translates the destination address from the address "PROXY#0" of the proxy server 2 into the address "CL#0" of the client 1, and transmits an address-translated response packet 6b to the client 1.

In this manner, the request packet 5a output from the proxy server 2 has its source address translated into the address "CL#0" of the client 1 by the address translating apparatus 3, and is transmitted to the server 4. The response packet 6 from the server 4 has its destination address translated into the address "PROXY#0" of the proxy server 2 by the address translating apparatus 3, and is transmitted to the proxy server 2.

As a result, the server 4 can equally handle the request packet 5b transmitted via the proxy server 2 and a request packet transmitted not via the proxy server 2. That is, the server 4 is not required to analyze the contents of request packets and determine the address "CL#0" of the client 1. Consequently, an environment for providing services wherein the address "CL#0" of the client 1 is specified can easily be constructed in the server 4.

1st Embodiment

Figure 2:
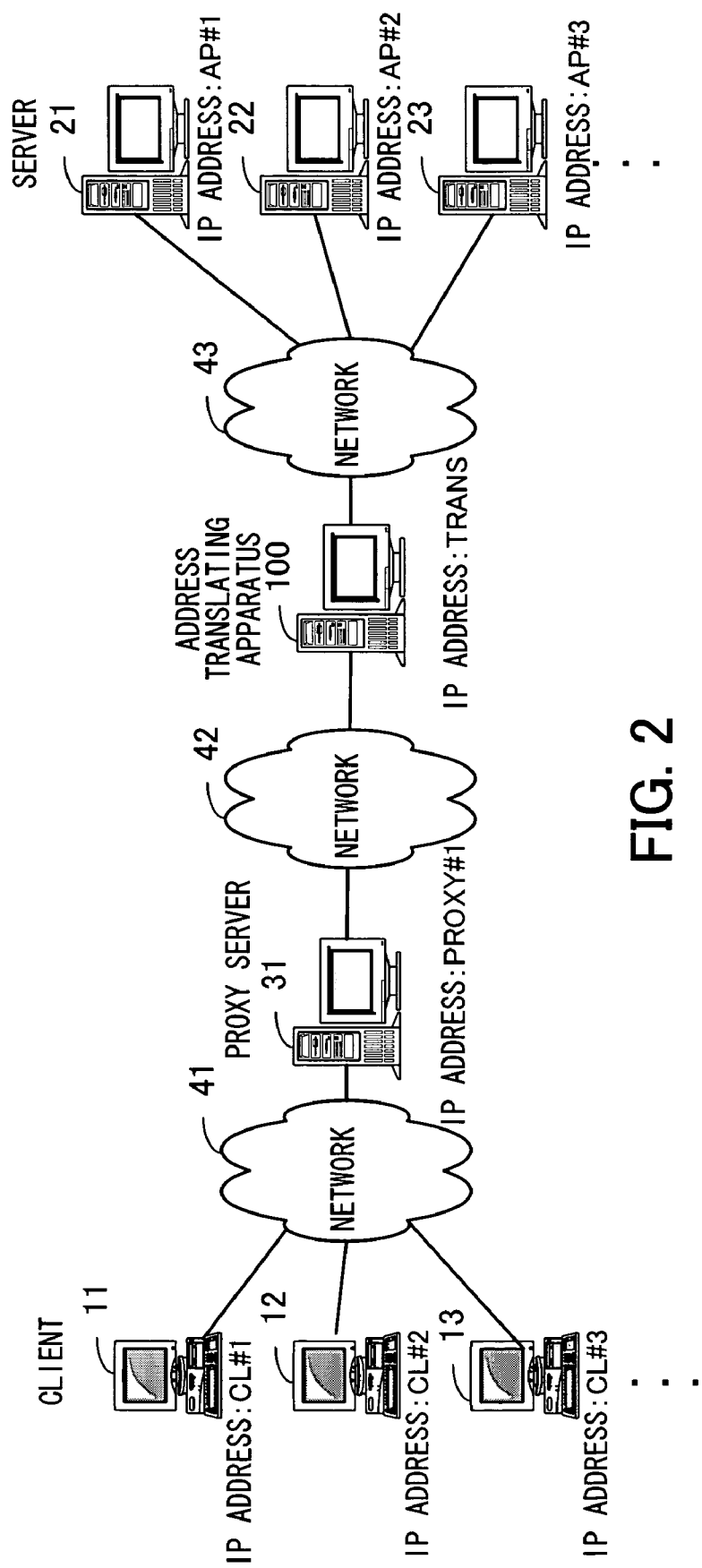
FIG. 2 is a view showing a system arrangement for realizing a first embodiment of the present invention.

FIG. 2 is a view showing a system arrangement for realizing a first embodiment of the present invention. As shown in FIG. 2, a plurality of clients 11, 12, 13, . . . are connected to a proxy server 31 through a network 41. The proxy server 31 is connected to an address translating apparatus 100 through a network 42. The address translating apparatus 100 is connected to a plurality of servers 21, 22, 23, through a network 43. In the system arrangement shown in FIG. 2, the client 11 has an IP address "CL#1", the client 12 has an IP address "CL#2", the client 13 has an IP address "CL#3", the proxy server 31 has an IP address "PROXY#1", the address translating apparatus 100 has an IP address "TRANS", the server 21 has an IP address "AP#1", the server 22 has an IP address "AP#2", and the server 23 has an IP address "AP#3".

The clients 11, 12, 13, . . . are computers that are used by respective users. The servers 21, 22, 23, . . . are computers for providing services such as the distribution of Web pages or the like in response to requests from the clients 11, 12, 13, . . . . The proxy server 31 is a computer for accessing the servers 21, 22, 23, on behalf of the clients 11, 12, 13, . . . that are connected to the network 41.

The network 41 is an internal network protected by the proxy server 31. For example, the network 41 is an in-office intranet. The network 42 is a wide-area network such as the Internet, for example. The network 43 is an in-office network of an enterprise which provides a plurality of services through the network.

The address translating apparatus 100 receives packets output from the proxy server 31, and translates the address of the proxy server 31 into the addresses of the clients 11, 12, 13, . . . . The address translating apparatus 100 also translates the addresses of the clients 11, 12, 13, . . . into the address of the proxy server 31. The address translating apparatus 100 retains the IP address "PROXY#1" of the proxy server 31 for performing the address translating process.

Figure 3:
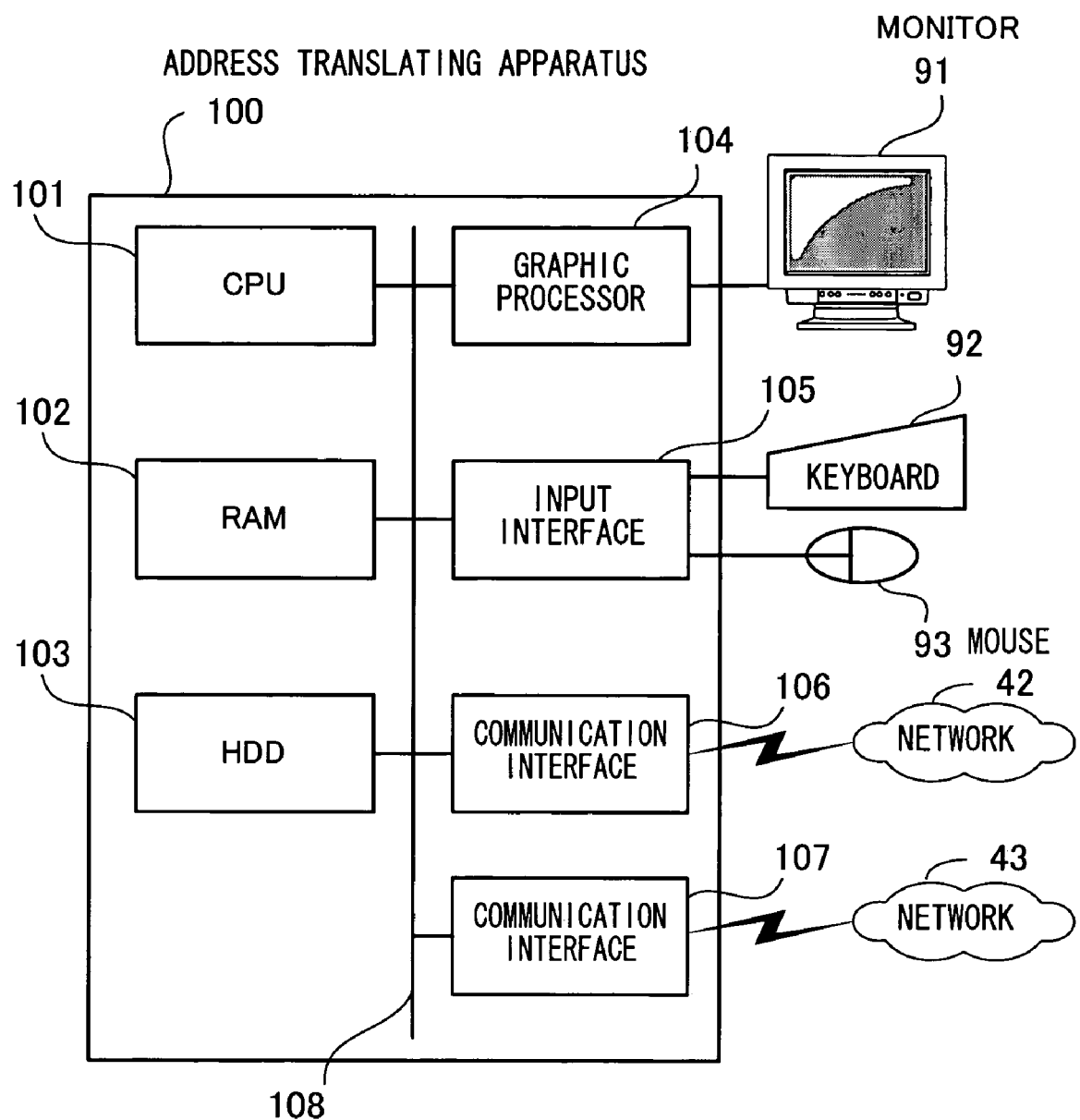
FIG. 3 is a block diagram showing a hardware arrangement of an address translating apparatus according to the embodiment of the present invention.

FIG. 3 shows in block form a hardware arrangement of the address translating apparatus 100 according to the embodiment of the present invention. As shown in FIG. 3, the address translating apparatus 100 is controlled in its entirety by a CPU (Central Processing Unit) 101. To the CPU 101, there are connected a RAM (Random Access Memory) 102, a hard disk drive (HDD) 103, a graphic processor 104, an input interface 105, and a plurality of communication interfaces 106, 107 by a bus 108.

The RAM 102 temporarily stores at least part of an OS (Operating System) program and application programs that are to be executed by the CPU 101. The RAM 102 also temporarily stores various data required in the processing operation of the CPU 101. The HDD 103 stores the OS program and the application programs.

A display monitor 91 is connected to the graphic processor 104. The graphic processor 104 displays images on the screen of the display monitor 91 according to instructions from the CPU 101. A keyboard 92 and a mouse 93 are connected to the input interface 105. The input interface 105 transmits signals sent from the keyboard 92 and the mouse 93 through the bus 108 to the CPU 101.

The communication interface 106 is connected to the network 42. The communication interface 106 transmits data to and receives data from another computer such as the proxy servers 31 or the like via the network 42.

The hardware arrangement described above makes it possible to perform processing functions according to the first embodiment. While FIG. 3 shows the hardware arrangement of the address translating apparatus 100, the clients 11, 12, 13, . . . , the servers 21, 22, 23, . . . , and the proxy server 31 can be implemented by the same hardware arrangement as shown in FIG. 3.

Figure 4:
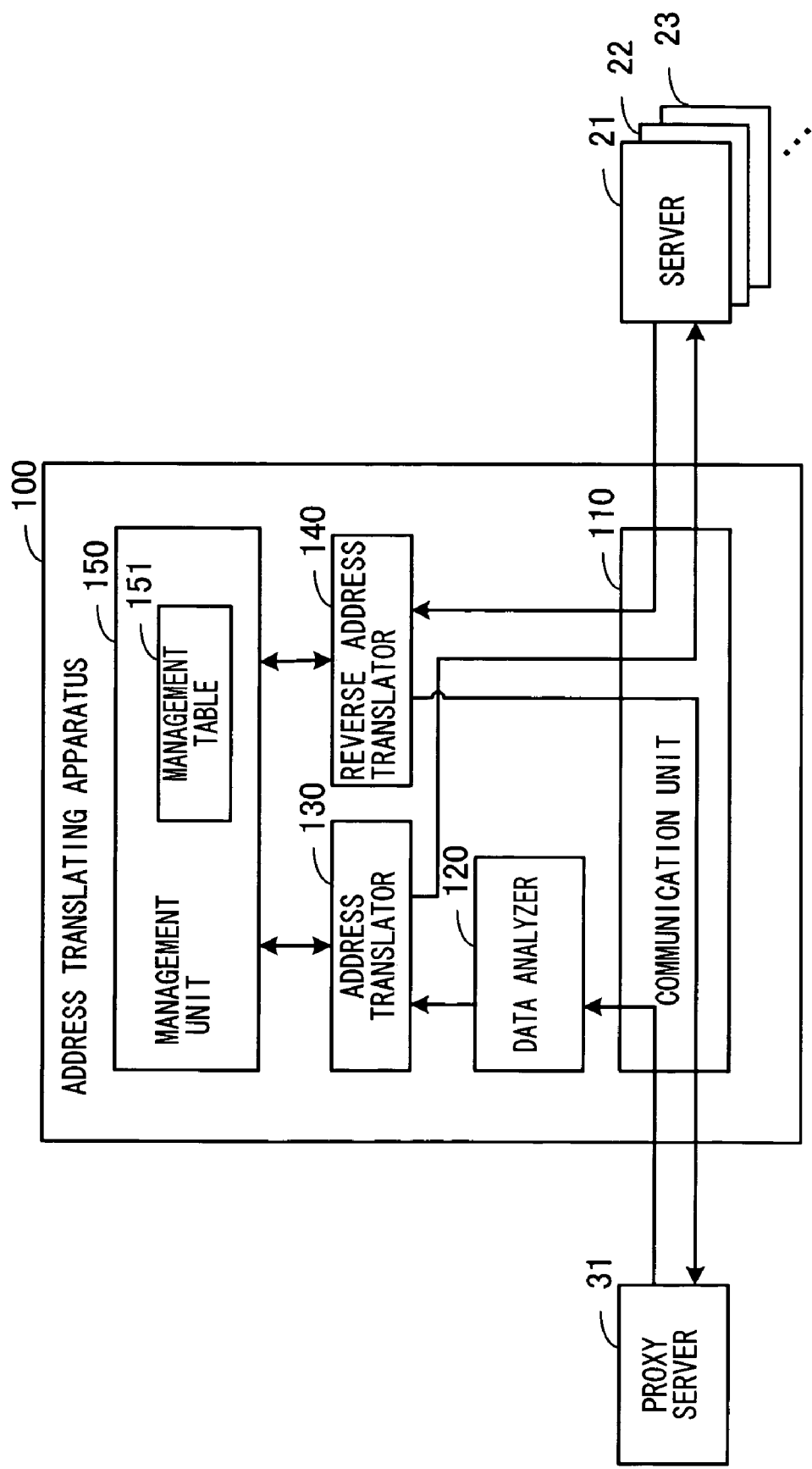
FIG. 4 is a block diagram showing functions of the address translating apparatus.

FIG. 4 shows in block diagram functions of the address translating apparatus 100. As shown in FIG. 4, the address translating apparatus 100 has a communication unit 110, a data analyzer 120, an address translator 130, a reverse address translator 140, and a management unit 150.

The communication unit 110 transmits packets to and receives packets from the proxy server 31 and the servers 21, 22, 23, . . . . Specifically, the communication unit 110 transmits packets received from the proxy server 31 to the data analyzer 120, and transmits packets received from the reverse address translator 140 to the proxy server 31. The communication unit 110 transmits packets received from the servers 21, 22, 23, . . . to the reverse address translator 140, and transmits packets received from the address translator 130 to the servers 21, 22, 23, . . . .

When the data analyzer 120 receives a packet from the communication unit 110, the data analyzer 120 analyzes data (e.g., the contents of an application header) generated by applications on the clients 11, 12, 13, . . . , and extracts the address of a client which is a source. The data analyzer 120 then transmits the packet received from the communication unit 110 and the extracted address to the address translator 130.

The address translator 130 translates the source address of a packet translated from the proxy server 31 from the address of the proxy server 31 into the address of a client which has transmitted the packet. The address translator 130 then transmits the address-translated packet to the communication unit 110.

When the reverse address translator 140 receives a packet transmitted from the servers 21, 22, 23, . . . from the communication unit 110, the reverse address translator 140 receives the address of the proxy server 31, which is to be the destination of the packet, from the management unit 150. Then, the reverse address translator 140 translates the destination address from the address of the clients 11, 12, 13, . . . into the address of the proxy server 31 (reverse translation). The reverse address translator 140 then transmits the address-translated packet to the communication unit 110.

The management unit 150 has a management table 151 for registering the address of the proxy server 31 therein. In response to an operation input from the user or the like, the management unit 150 registers the address of the proxy server 31 in the management table 151. When the management unit 150 receives an inquiry about the address of the proxy server 31 from the reverse address translator 140, the management unit 150 refers to the management table 151 and sends the corresponding address of the proxy server 31 to the reverse address translator 140.

The address translating apparatus 100 with the above function translates the addresses of packets that are communicated via the proxy server 31.

Figure 5:
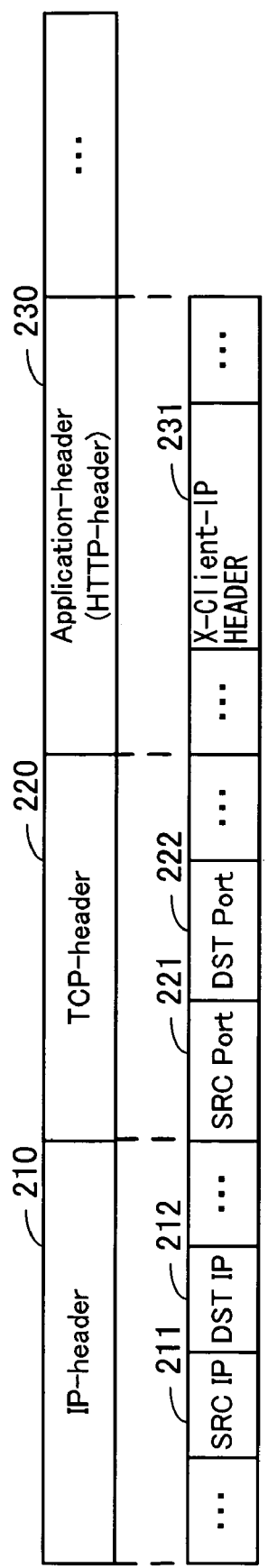
FIG. 5 is a diagram showing a data structure of a packet that is transmitted and received.

FIG. 5 shows a data structure of a packet that is transmitted and received. The data structure shown in FIG. 5 is related to only the address translating function. As shown in FIG. 5, the packet contains an IP-header 210, a TCP-header 220, and an Application-header 230. The Application-header 230 is an HTTP header, for example.

The IP header 210 contains a source IP address (SRC IP) 211 and a destination IP address (DST IP) 212. The TCP header 220 contains a source port (SRC Port) 221 and a destination port (DST Port) 222. The application header 230 contains an X-Client-IP header 231.

For an address translation using the address translating apparatus 100, the IP address of the proxy server 31 is first registered in the management table 151 of the management unit 150.

Figure 6:
FIG. 6 is a diagram showing data of a management table.

FIG. 6 shows data of the management table 151. As shown in FIG. 6, the management table 151 has the address "PROXY#1" of the proxy server 31.

Thereafter, when the clients 11, 12, 13, ... transmit a packet which requests processing (request packet) to the servers 21, 22, 23, ..., the packet is relayed by the proxy server 31. It is assumed below that the client 11 transmits a processing request packet destined for the server 21.

The proxy server 31 changes the source address of the received packet to its own IP address, and changes the destination address to the IP address of the server 21. The proxy server 31 then transmits the address-translated packet to the network 42. The packet is input via the network 42 to the address translating apparatus 100. Having received the packet, the address translating apparatus 100 translates the source address.

Figure 7:
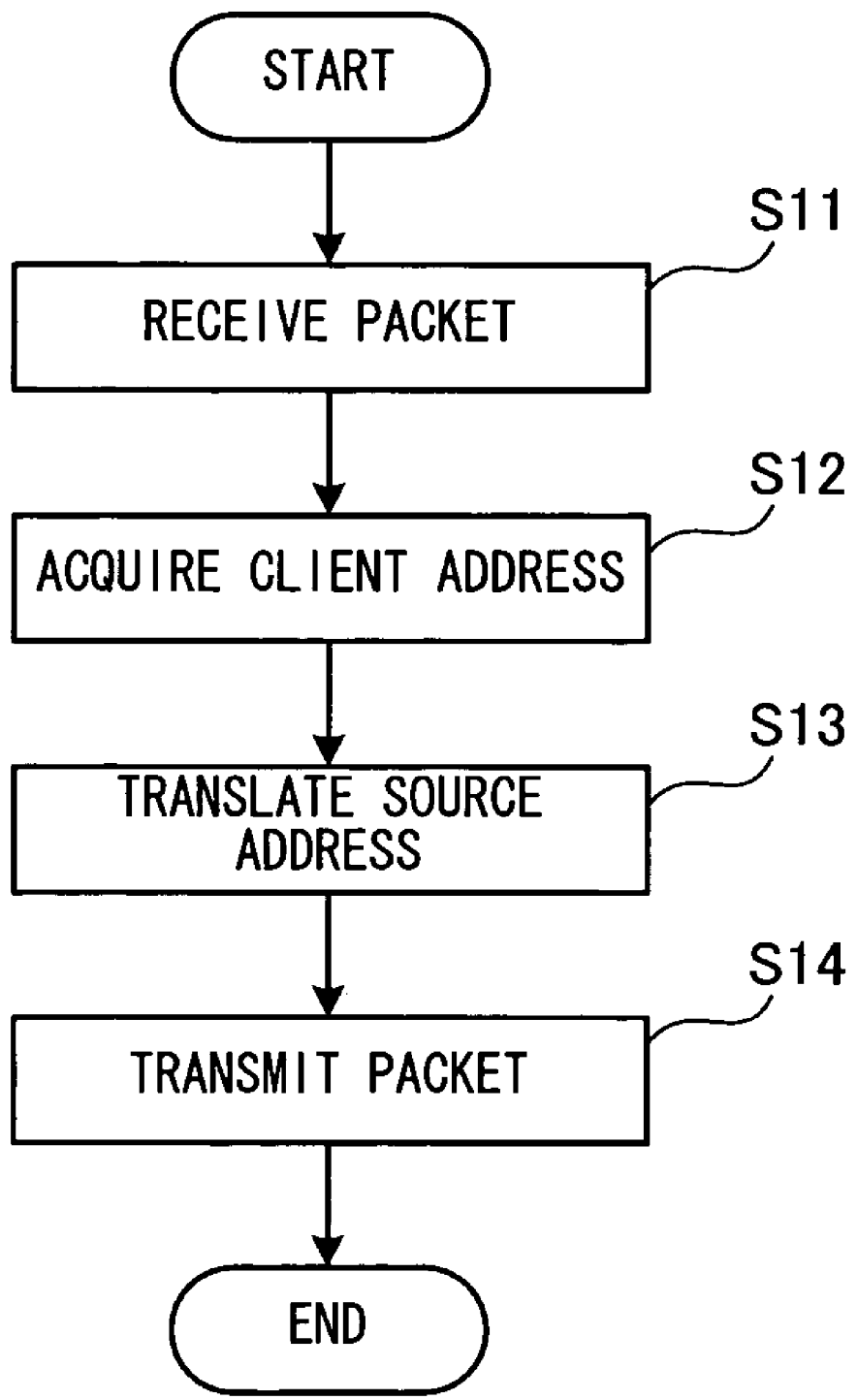
FIG. 7 is a flowchart of a processing sequence for translating the address of a request packet.

FIG. 7 shows a processing sequence for translating the address of a request packet. The address translating sequence will be described below in the order of step numbers shown in FIG. 7.

[STEP S11] The communication unit 110 receives the packet output from the client 11 via the proxy server 31, and gives the packet to the data analyzer 120.

[STEP S12] The data analyzer 120 analyzes the contents of the application header of the received packet, and acquires the address of the client 11 which is the source. Specifically, the data analyzer 120 acquires the information of "X-Client-IP header" in the application header 230 as the address of the client 11. The data analyzer 120 then sends the acquired address of the client 11, together with the received packet, to the address translator 130.

[STEP S13] The address translator 130 translates the source address of the received packet into the address of the client 11 which has been received from the data analyzer 120, and gives the address of the client 11 to the communication unit 110.

[STEP S14] The communication unit 110 transmits the packet whose source represents the address of the client 11 to the server 21.

When the server 21 receives the packet which request processing, the server 21 performs a processing operation based on the request. Then, the server 21 transmits a packet (response packet) as a response (which represents the processed result) to the request packet, using the address of the client 11, which is set as the source of the request packet, as the destination address. The packet is given to the address translating apparatus 100. The address translating apparatus 100 then translates the destination address (reverse translation).

Figure 8:
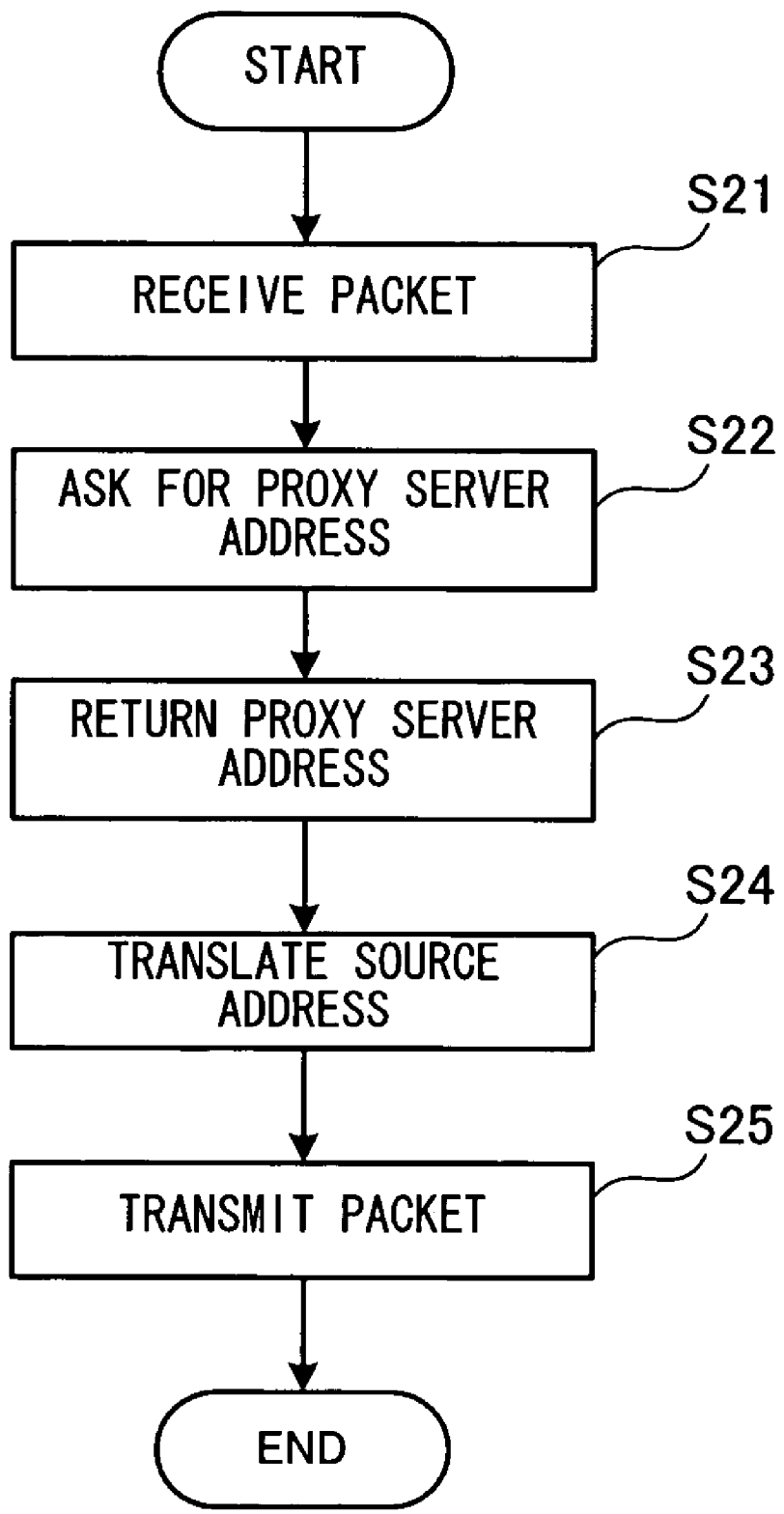
FIG. 8 is a flowchart of a processing sequence for translating the address of a response packet.

FIG. 8 shows a processing sequence for translating the address of a response packet.

[STEP S21] The communication unit 110 receives the packet sent from the server 21, and gives the received packet to the reverse address translator 140.

[STEP S22] The reverse address translator 140 asks the management unit 150 for the address of the proxy server 31.

[STEP S23] The management unit 150 returns the address "PROXY#1" of the proxy server 31 which has been set in advance in the management table 151 to the reverse address translator 140.

[STEP S24] The reverse address translator 140 translates the destination address of the packet received from the communication unit 110 into the address "PROXY#1" of the proxy server 31 returned from the management unit 150, and gives the address-translated packet to the communication unit 110.

[STEP S25] The communication unit 110 transmits the packet received from the reverse address translator 140 to the proxy server 31.

A specific example of the address translation performed by the address translating apparatus 100 will be described below.

Figure 9:
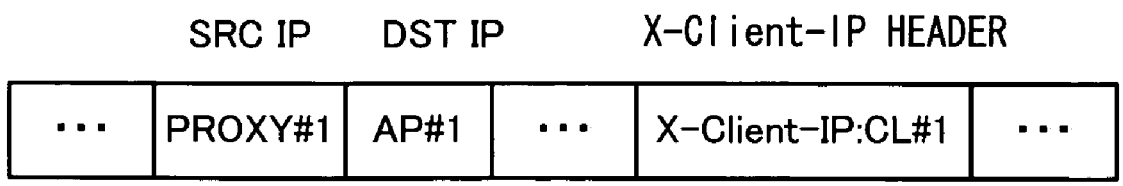
FIG. 9 is a diagram showing an example of the translation of the address of a request packet.
Figure 9:
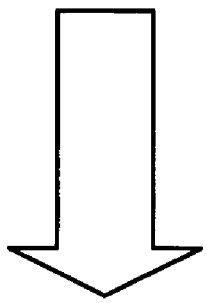
Figure 9:
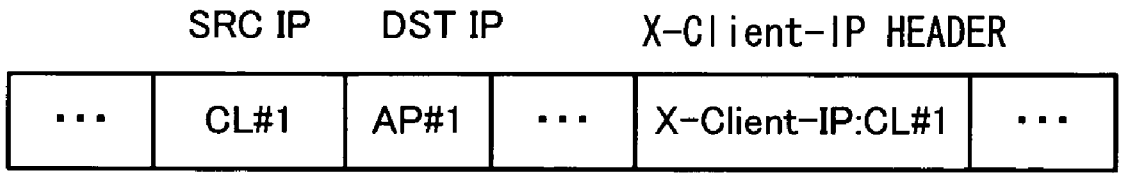

FIG. 9 shows an example of the translation of the address of a request packet. A packet 51 that is input to the address translating apparatus 100 via the proxy server 31 has a source IP address (SRC IP) "PROXY#1", a destination IP address (DST IP) "AP#1", and an X-Client-IP header "X-Client-IP: CL#1". When the packet 51 is supplied to the address translating apparatus 100, the address translating apparatus 100 generates a packet 52 where the source address has been translated, and transmits the packet 52 to the server 21. In the packet 52, the source IP address (SRC IP) is translated into "CL#1", and other information remains unchanged.

Figure 10:
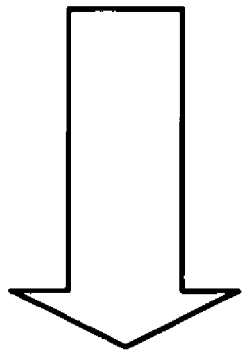
FIG. 10 is a diagram showing an example of the translation of the address of a response packet.

FIG. 10 shows an example of the translation of the address of a response packet. As shown in FIG. 10, a packet 53 that is input as a response from the server 21 to the address translating apparatus 100 has a source IP address (SRC IP) "AP#1" and a destination IP address (DST IP) "CL#1". When the packet 53 is supplied to the address translating apparatus 100, the address translating apparatus 100 generates a packet 54 where the source address has been translated, and transmits the packet 54 to the proxy server 31. In the packet 54, the source IP address (SRC IP) is translated into "PROXY#1", and other information remains unchanged.

In this manner, even a packet that is communicated via the proxy server 31 can be transmitted to the server 21, using the address of the client 11 as the source. The server 21 can process a packet transmitted via the proxy server 31 and a packet transmitted not via the proxy server 31 depending on the request, without having to distinguish them from each other. Therefore, even if a plurality of servers 21, 22, 23, ... exist as shown in FIG. 2, each of the servers 21, 22, 23, ... is not required to have a function to analyze the contents of application headers. As a result, the servers 21, 22, 23, ... can be constructed with ease.

2nd Embodiment

A second embodiment of the present invention will be described below. The second embodiment is concerned with an address translating apparatus which is capable of processing packets sent from a plurality of proxy servers.

Figure 11:
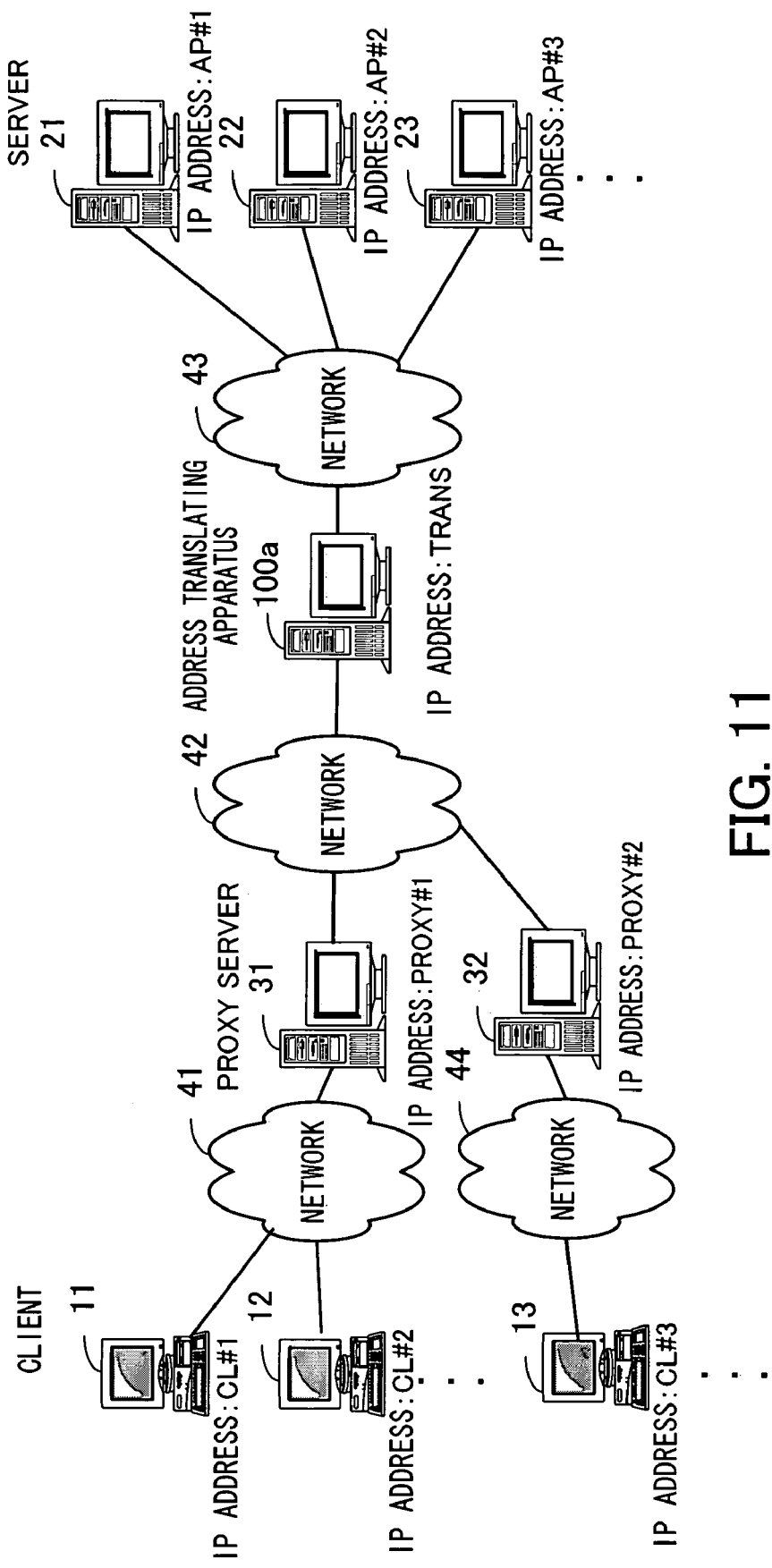
FIG. 11 is a view showing a system arrangement for realizing a second embodiment of the present invention.

FIG. 11 shows a system arrangement for realizing the second embodiment of the present invention. As shown in FIG. 11, a plurality of proxy servers 31, 32 are connected to a network. 42. Clients 11, 12, . . . are connected to the proxy server 31 through a network 41. Clients 13, . . . are connected to the proxy server 32 through a network 44. An address translating apparatus 100a is connected to the proxy servers 31, 32 through a network 42. The address translating apparatus 100a is also connected to servers 21, 22, 23, . . . through a network 43. The proxy server 32 has an IP address "PROXY#2". The IP addresses of the other apparatus of the system arrangement shown in FIG. 11 are identical to those of the system arrangement according to the first embodiment.

The address translating apparatus 100a is capable of processing packets sent via the proxy servers 31, 32. The address translating apparatus 100a has components identical to those of the address translating apparatus 100 according to the first embodiment shown in FIG. 4. However, the management table 151 will specifically be described below, using another reference character.

FIG. 12 shows a data structure of a management table according to the second embodiment. As shown in FIG. 12, a management table 151a has a vertical column of source addresses to be translated and a vertical column of source addresses that are translated, in association with item numbers. In the management table 151a, items of information in each of horizontal rows across the vertical columns are related to each other, and serve as a record.

The column of item numbers contain numbers for uniquely identifying respective records. The column of source addresses to be translated contains addresses to be translated (proxy server addresses) when the source addresses of request packets are translated. The column of source addresses that are translated contains addresses that are translated (client addresses) when the source addresses of request packets are translated.

In the example shown in FIG. 12, the address "PROXY#1" to be translated and the address "CL#1" that is translated are set in association with the item number "1", and the address "PROXY#2" to be translated and the address "CL#3" that is translated are set in association with the item number "2".

Figure 13:
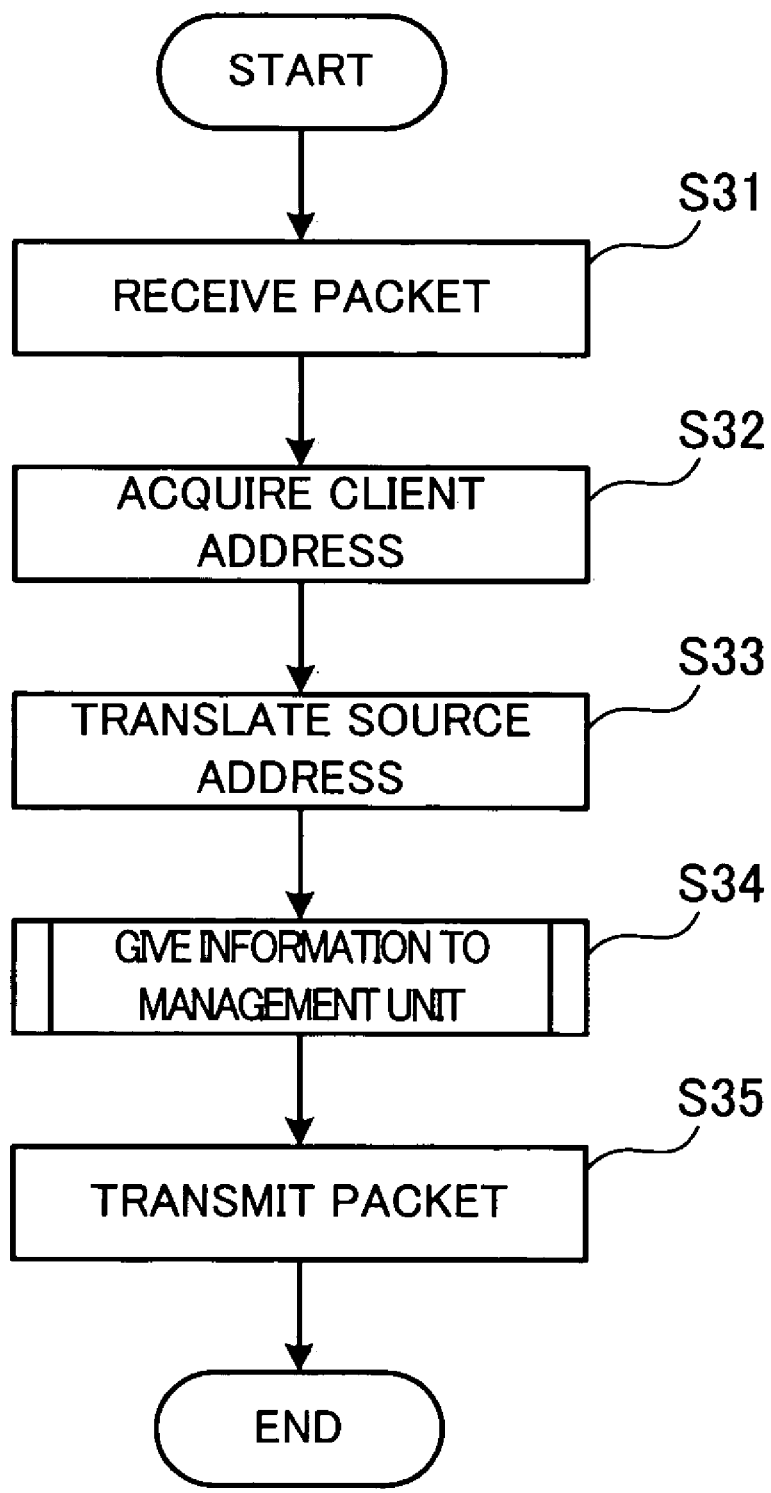
FIG. 13 is a flowchart of a processing sequence for translating the address of a request packet according to the second embodiment.

Thus, the management table 151a in the address translating apparatus 100a according to the second embodiment can store the addresses of the plural proxy servers 31, 32. With the management table 151a storing the addresses as shown in FIG. 12, when the client 12 transmits a request packet to the server 21, the address translating apparatus 100a performs the following processing operation:

FIG. 13 shows a processing sequence for translating the address of a request packet according to the second embodiment. The address translating sequence will be described below in the order of step numbers shown in FIG. 13.

[STEP S31] The communication unit 110 receives the packet output from the client 12 via the proxy server 31, and gives the packet to the data analyzer 120.

[STEP S32] The data analyzer 120 analyzes the contents of the application header of the received packet, and acquires the address of the client 12 which is the source. The data analyzer 120 then sends the acquired address of the client 12, together with the received packet, to the address translator 130.

[STEP S33] The address translator 130 translates the source address of the received packet into the address of the client 12 which has been received from the data analyzer 120. The address translator 130 gives the source address to be translated (the address of the proxy server 31) and the source address that is translated (the address of the client 12) to the management unit 150, and gives the packet whose source address has been translated to the communication unit 110.

[STEP S34] The management unit 150 registers a set of the source address to be translated and the source address that is translated in the management table 151a.

[STEP S35] The communication unit 110 transmits the packet whose source represents the address of the client 12 to the server 21.

Figure 14:
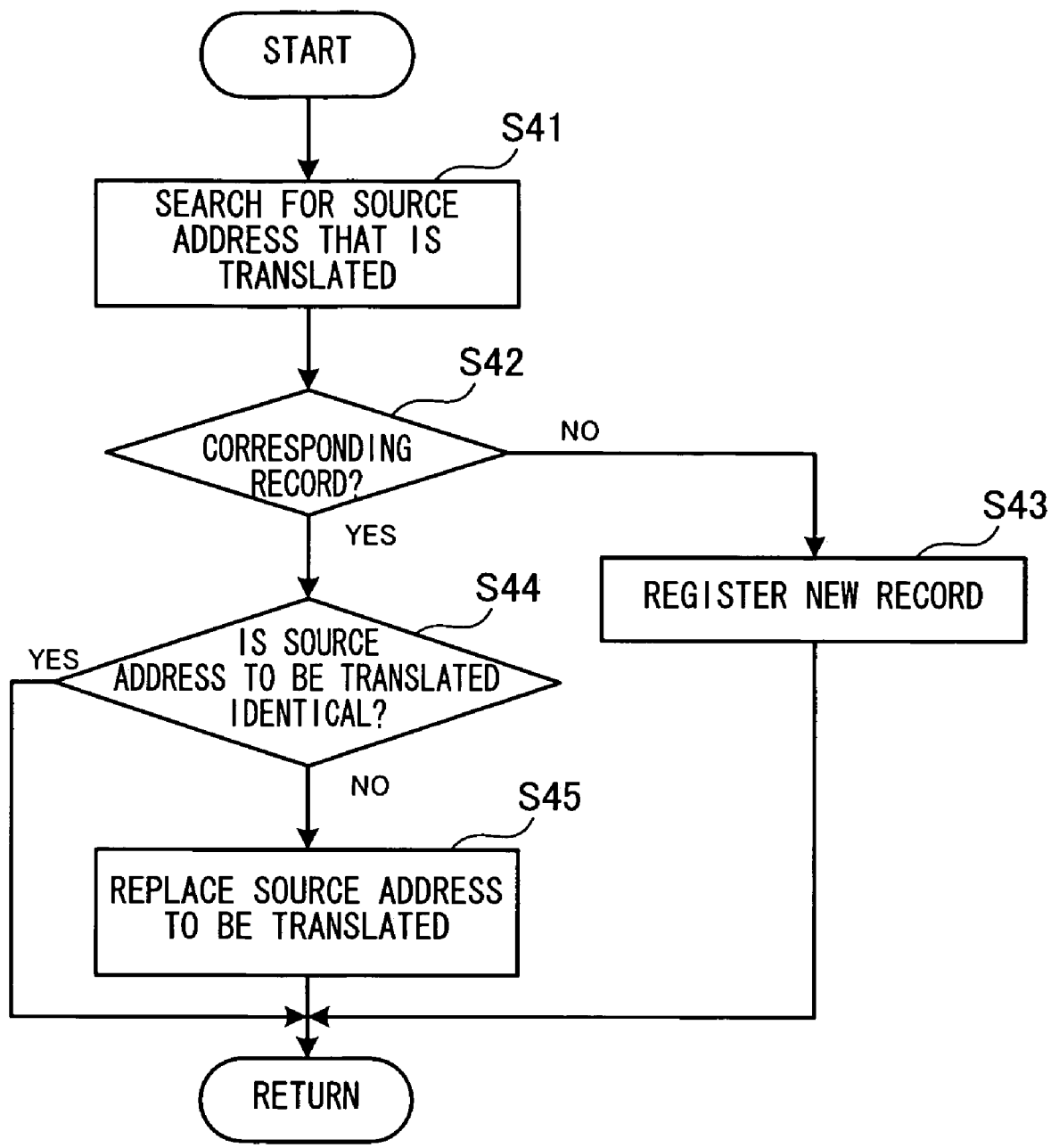
FIG. 14 is a flowchart showing in detail a processing sequence for registering an address in the management table.

FIG. 14 shows in detail a processing sequence for registering an address in the management table 151a. The processing sequence shown in FIG. 14 is a detailed representation of the processing STEP S34 shown in FIG. 13. The processing sequence shown in FIG. 14 will be described below in the order of step numbers shown therein.

[STEP S41] The management unit 150 searches the management table 151a for the source address that is translated (the address of the client 12).

[STEP S42] The management unit 150 determines whether a corresponding record is found in the management table 151a or not as a result of the searching process. If a corresponding record is found in the management table 151a, then control goes to STEP S44. If a corresponding record is not found in the management table 151a, then control goes to STEP S43.

[STEP S43] The management unit 150 registers a set of the source address to be translated (the address of the proxy server 31) and the source address that is translated (the address of the client 12) as a new record in the management table 151a. Thereafter, the processing sequence is put to an end.

[STEP S44] The management unit 150 determines whether the source address to be translated (the address of the proxy server 31) in the present address translating process and the source address to be translated which has been found in the searching process are identical to each other or not. If they are identical, then the processing sequence is put to an end. If they are not identical, then control goes to STEP S45.

[STEP S45] The management unit 150 replaces the source address to be translated of the detected record with the source address to be translated (the address of the proxy server 31) in the present address translating process. Thereafter, the processing sequence is put to an end.

A process of translating a destination address (reverse translation) in the address translating apparatus 100a at the time a response packet representative of a processed result is transmitted from the server 21 to the client 12 will be described below.

Figure 15:
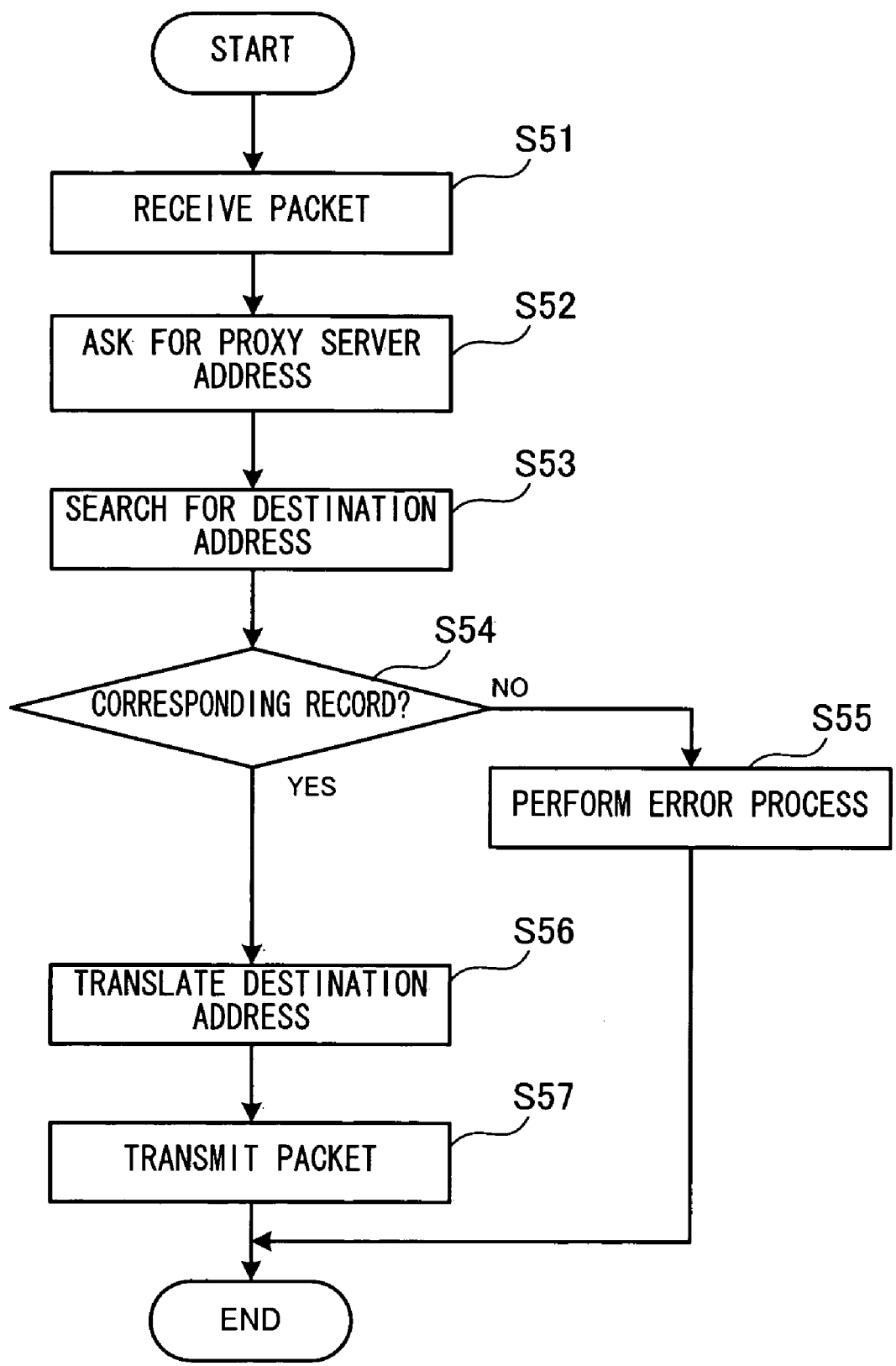
FIG. 15 is a flowchart of a processing sequence for translating the address of a response packet according to the second embodiment.

FIG. 15 shows a processing sequence for translating the address of a response packet according to the second embodiment. The processing sequence shown in FIG. 15 will be described below in the order of step numbers shown therein.

[STEP S51] The communication unit 110 receives the packet sent from the server 21, and gives the received packet to the-reverse address translator 140.

[STEP S52] The reverse address translator 140 gives the destination address of the received packet to the management unit 150 and asks the management unit 150 for the address of the proxy server 31.

[STEP S53] The management unit 150 searches the column of source addresses that are translated in the management table 151a for a record wherein an address identical to the given destination address is registered. The management unit 150 returns the source address to be translated of that record to the reverse address translator 140. If there is no corresponding record found, then the management unit 150 returns a value "null", for example, to the reverse address translator 140.

[STEP S54] The reverse address translator 140 determines whether a corresponding record is found or not as a result of the searching process. If a corresponding record is found, then control goes to STEP S56. If no corresponding record is found, then control goes to STEP S55.

[STEP S55] The reverse address translator 140 performs an error process, after which the processing sequence is ended.

[STEP S56] The reverse address translator 140 translates the destination address of the packet received from the communication unit 110 into the source address to be translated which is returned from the management unit 150, and gives the address-translated packet to the communication unit 110.

[STEP S57] The communication unit 110 transmits the packet received from the reverse address translator 140 to the proxy server 31.

A specific example of the address translation performed by the address translating apparatus 100a will be described below.

Figure 16:
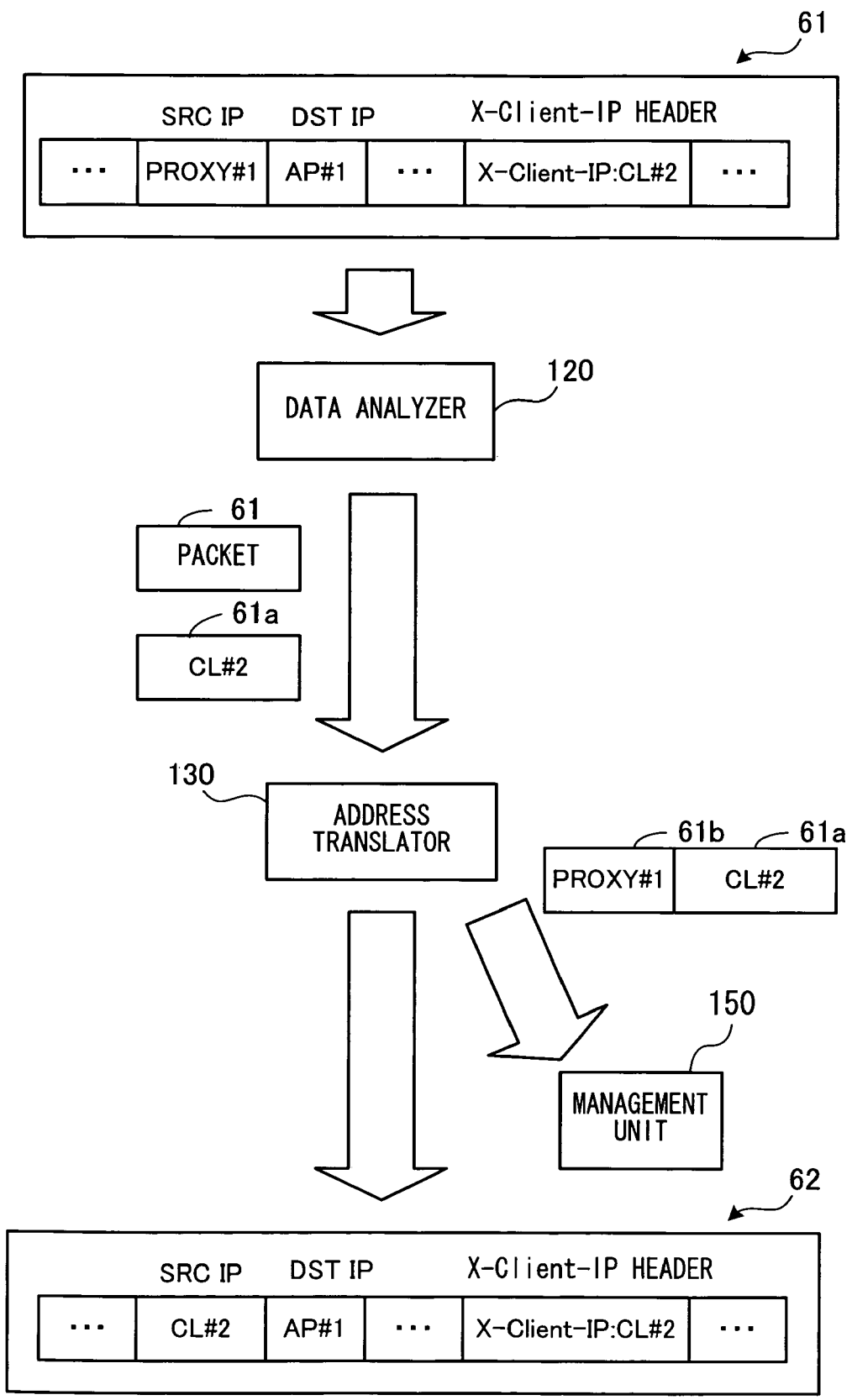
FIG. 16 is a diagram showing an example of the translation of the address of a request packet.

FIG. 16 shows an example of the translation of the address of a request packet. A packet 61 that is output from the client 12 and input to the address translating apparatus 100a via the proxy server 31 has a source IP address (SRC IP) "PROXY#1", a destination IP address (DST IP) "AP#1", and an X-Client-IP header "X-Client-IP: CL#2".

When the packet 61 is supplied to the address translating apparatus 100a, the data analyzer 120 extracts the address 61a (CL#2) of the client 12 from the X-Client-IP header. The packet 61 and the address 61a are given to the address translator 130.

The address translator 130 translates the source address of the packet 61, generating a packet 62. The packet 62 is transmitted via the communication unit 110 to the server 21. In the packet 62, the source IP address (SRC IP) is translated into "CL#2", and other information remains unchanged.

The address translator 130 gives a set of the address 61b "PROXY#1" of the proxy server 31 and the address 61a "CL#2" of the client 12 to the management unit 150, which adds the set of the addresses as a new record to the management table 151a.

FIG. 17 shows the management table 151a after a record has been added thereto. As shown in FIG. 17, the set of the source address "PROXY#1" and the address "CL#2" of the client that is registered in the X-Client-IP header, which are read from the packet 61 shown in FIG. 16, is recorded as a new record in the management table 151a.

Figure 18:
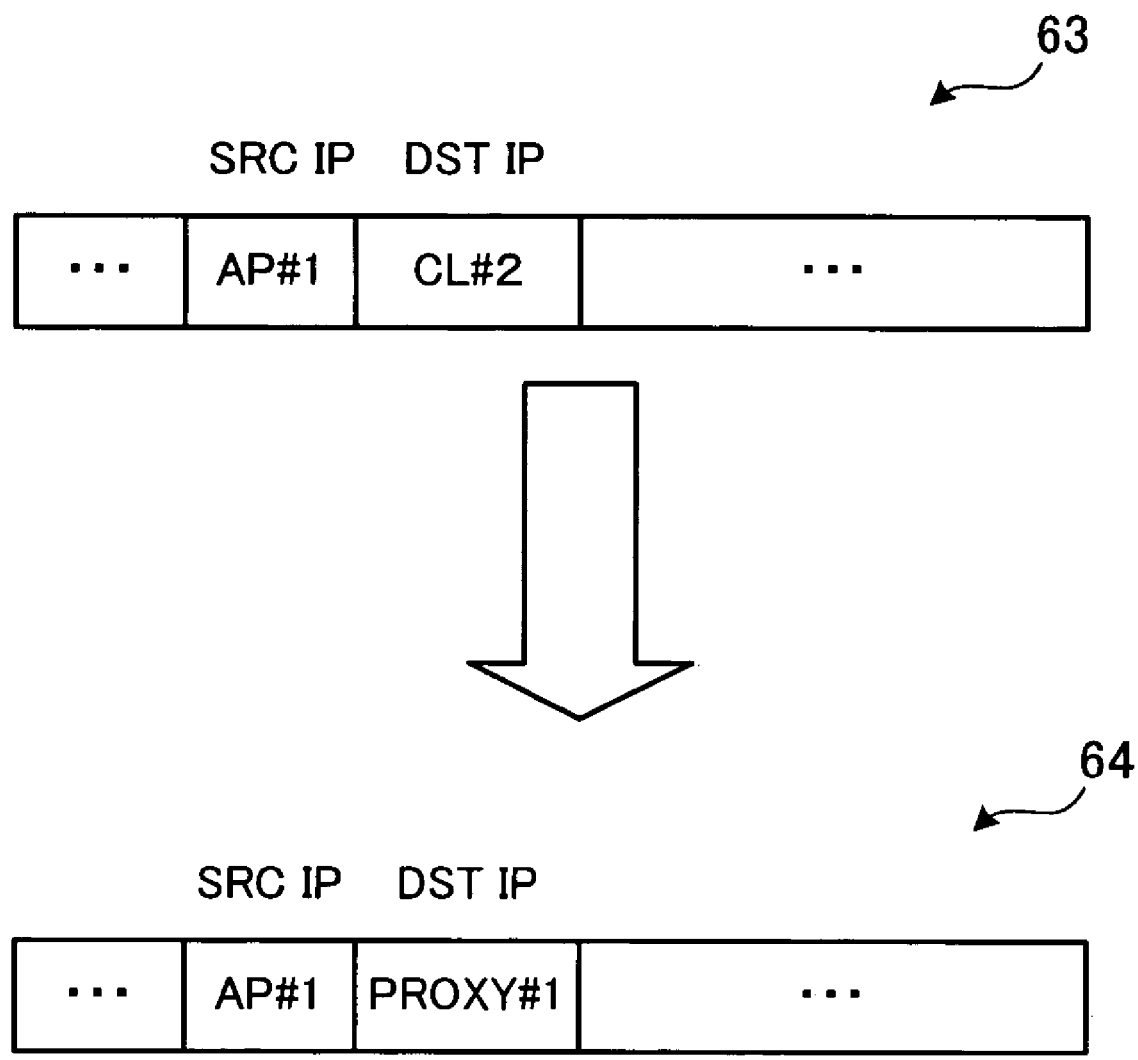
FIG. 18 is a diagram showing an example of the translation of the address of a response packet.

FIG. 18 shows an example of the translation of the address of a response packet. A packet 63 that is input as a response from the server 21 to the address translating apparatus 100a has a source IP address (SRC IP) "AP#1" and a destination IP address (DST IP) "CL#2". When the packet 63 is supplied to the address translating apparatus 100a, the management table 151a is referred to, and the source address "PROXY#1" to be translated of the record wherein the source address that is translated is "CL#2" is acquired. The address translating apparatus 100a generates a packet 64 where the source address has been translated, and transmits the packet 64 to the proxy server 31. In the packet 64, the destination IP address (DST IP) is translated into "PROXY#1", and other information remains unchanged.

As described above, it is possible to translate the addresses of packets that are transmitted via the plural proxy servers 31, 32. According to the second embodiment, for translating the source address of a request packet from the client, a set of the source address to be translated and the source address that is translated is stored in the management table 151a. Then, the destination address of a response packet from a server is translated by referring to the management table 151a, so that the response packet can be returned through the same route as the request packet.

3rd Embodiment

A third embodiment of the present invention will be described below. According to the third embodiment, an address translating process is performed on a packet that is transmitted to either one of a plurality of proxy servers via a load distributing apparatus. If request packets are distributed to the proxy servers by the load distributing apparatus, then a proxy server for relaying a request packet output from one client is not uniquely determined. In this case, the following problem arises:

When the source address of a request packet is changed by a proxy server, the address of the client which is to be the destination of a response packet for the request packet is recognized by only the proxy server which has relayed the request packet. If a proxy server accesses a server on behalf of a client, then the processing sequence is completed when the proxy server receives a response packet for the request packet which the proxy server has transmitted. Therefore, even if a proxy server which relays a request packet output from a certain client is not uniquely determined, a response packet for the request packet needs to be returned to the proxy server which has relayed the request packet.

According to the third embodiment, a unique communication identifier is set for a request packet, and an address translating apparatus manages which proxy server has relayed the request packet.

In the description which follows, a communication identifier represents identifying information for uniquely identifying an application which is operating on a client or a server, e.g., a TCP port number. The communication identifier of an application which transmits a packet is a source communication identifier, and the communication identifier of an application which receives a packet is a destination communication identifier.

Figure 19:
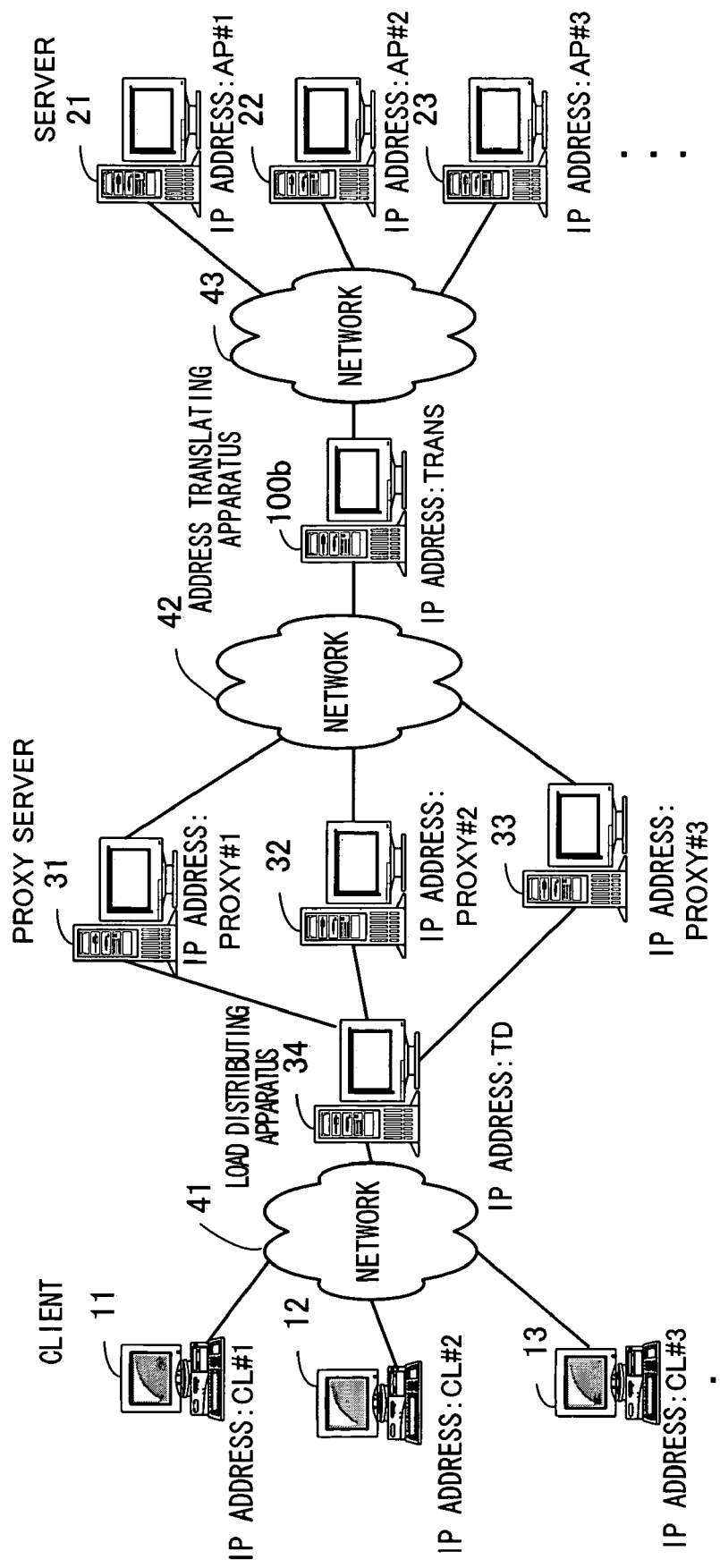
FIG. 19 is a view showing a system arrangement for realizing a third embodiment of the present invention.

FIG. 19 shows a system arrangement for realizing a third embodiment of the present invention. According to the third embodiment, a plurality of proxy servers 31, 32, 33, . . . are connected to a load distributing apparatus 34. Other details of the system arrangement shown in FIG. 19 are the same as those of the system arrangement according to the first embodiment shown in FIG. 2. The proxy server 33 has an IP address "PROXY#3", the load distributing apparatus 34 has an IP address "TD", and an address translating apparatus 100b has an IP address "TRANS". The IP addresses of the other apparatus of the system arrangement shown in FIG. 19 are identical to those of the system arrangement according to the second embodiment.

The load distributing apparatus 34 monitors the load condition of the proxy servers 31, 32, 33, 34. The load distributing apparatus 34 transfers packets sent from clients 11, 12, 13, . . . to a proxy server which is under a relatively small load.

When the address translating apparatus 100b receives a packet distributed by the load distributing apparatus 34 via the proxy servers 31, 32, 33, the address translating apparatus 100b converts the source address of the packet, and transmits the address-translated packet to the servers 21, 22, 23, . . . . At this time, the address translating apparatus 100b changes the source address and source communication identifier of the received packet.

At the same time that the address translating apparatus 100b changes the source address and source communication identifier, the address translating apparatus 100b also registers an association of the destination communication identifier of the received packet and the communication identifier that is translated, in addition to an association of the source address of the received packet and the source address that is translated, in a management table. The components of the address translating apparatus 100b are identical to those of the address translating apparatus 100 according to the first embodiment. The functions of the components of the address translating apparatus 100b will be described below using the reference characters shown in FIG. 4. However, the management table 151 will specifically be described below, using another reference character.

FIG. 20 shows a data structure of a management table according to the third embodiment. As shown in FIG. 20, a management table 151b has a vertical column of source addresses to be translated, a vertical column of source communication identifiers to be translated, a vertical column of source addresses that are translated, and a vertical column of source communication identifiers that are translated, in association with item numbers. In the management table 151b, items of information in each of horizontal rows across the vertical columns are related to each other, and serve as a record.

The column of item numbers contain numbers for uniquely identifying respective records.

The column of source addresses to be translated contains addresses to be translated (proxy server addresses) when the source addresses of packets representative of processing requests from clients to servers are translated. The column of source communication identifiers to be translated contains source communication identifiers to be translated of packets representative of processing requests from clients to servers.

The column of source addresses that are translated contains addresses that are translated (client addresses) when the source addresses are translated. The column of source communication identifiers that are translated contains source communication identifiers that are translated of packets representative of processing requests from clients to servers. The source communication identifiers that are translated are unique communication identifiers that are generated by the address translating apparatus 100b.

In the example shown in FIG. 19, an address "PROXY#1" to be translated, a source communication identifier "PORT#1" to be translated, an address "CL#1" which is translated, and a source communication identifier "PORT#a" which is translated are set in association with the item number "1". In addition, an address "PROXY#2" to be translated, a source communication identifier "PORT#1" to be translated, an address "CL#1" which is translated, and a source communication identifier "PORT#b" which is translated are set in association with the item number "2".

Figure 21:
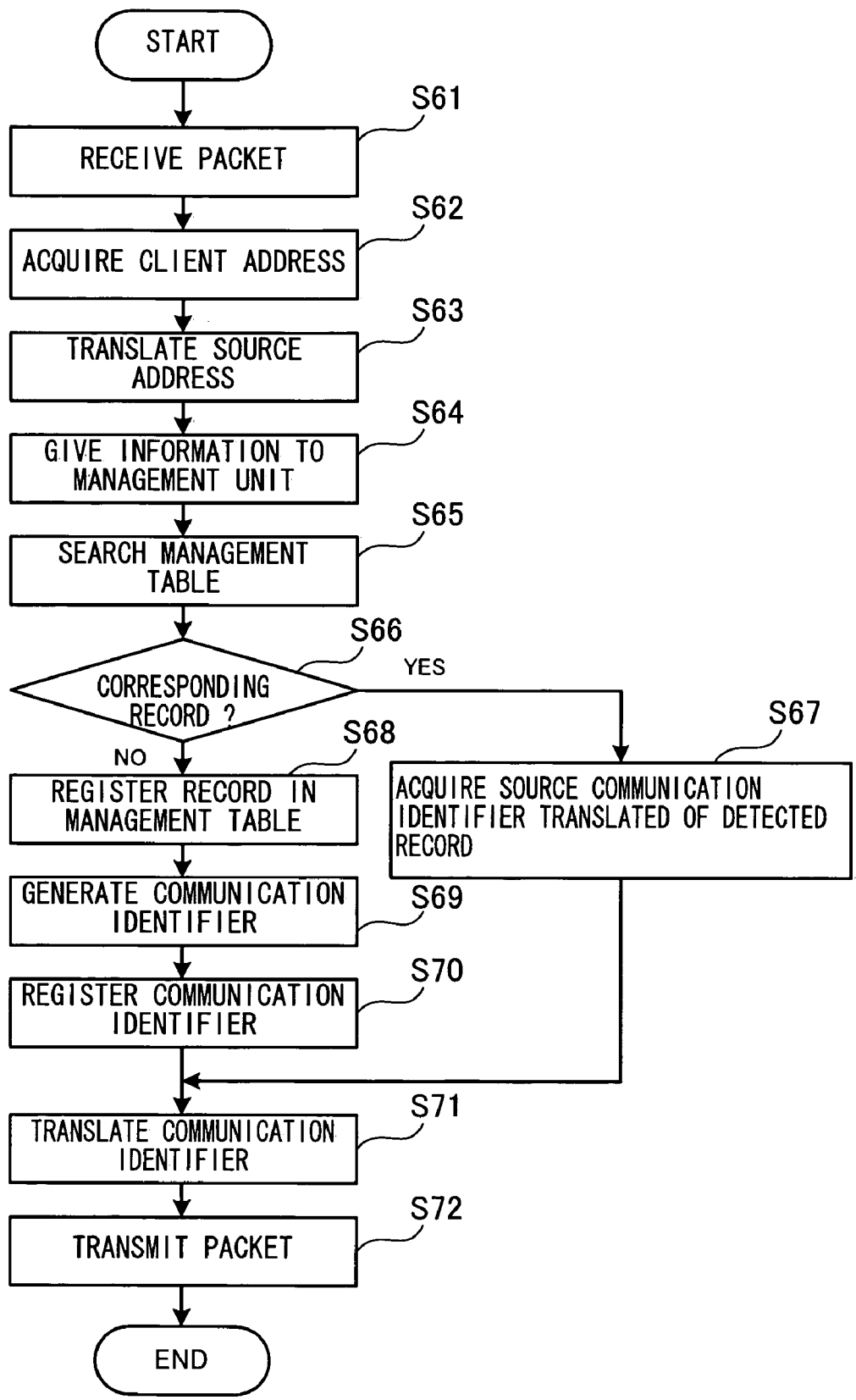
FIG. 21 is a flowchart of a processing sequence for translating the address of a request packet according to the third embodiment.

With the management table 151b storing the addresses as shown in FIG. 20, when the client 12 transmits a request packet to the server 21, the address translating apparatus 100b performs the following processing operation:

FIG. 21 shows a processing sequence for translating the address of a request packet according to the third embodiment. The address translating sequence will be described below in the order of step numbers shown in FIG. 21.

[STEP S61] The communication unit 110 receives a packet output from a proxy server, and gives the packet to the data analyzer 120.

[STEP S62] The data analyzer 120 analyzes the contents of the received packet, and acquires the address of the client 12 which is the source. The data analyzer 120 then sends the acquired address of the client 12, together with the received packet, to the address translator 130.

[STEP S63] The address translator 130 translates the source address of the received packet into the address of the client 12 which has been received from the data analyzer 120.

[STEP S64] The address translator 130 gives the source address to be translated (the address of the proxy server 31), the source address that is translated (the address of the client 12), and the source communication identifier to be translated of the received packet to the management unit 150.

[STEP S65] The management unit 150 searches the management table 151b for the source address to be translated, the source address that is translated, and the source communication identifier to be translated. That is, the management unit 150 searches the management table 151b for a record which is in conformity with the information received from the address translator 130.

[STEP S66] If the management unit 150 finds a corresponding record as a result of the searching process, then control goes to STEP S67. If the management unit 150 finds no corresponding record as a result of the searching process, then control goes to STEP S68.

[STEP S67] The management unit 150 returns the source communication identifier that is translated in the found record to the address translator 130. Thereafter, control goes to STEP S71.

[STEP S68] The management unit 150 registers the source address to be translated, the source address that is translated, and the source communication identifier to be translated as a new record in the management table 151b.

[STEP S69] The management unit 150 generates a communication identifier such that the source communication identifier that is translated becomes unique (uniquely identifiable) in the record wherein the source address that is translated (the address of the client 12) is the same.

[STEP S70] The management unit 150 registers the generated communication identifier as a source communication identifier that is translated in the newly registered record. The management unit 150 returns the generated communication identifier to the address translator 130.

[STEP S71] The address translator 130 translates the source identifier of the received packet into the communication identifier received from the management unit 150, and gives the packet to the communication unit 110.

[STEP S72] The communication unit 110 transmits the packet data received from the address translator 130 to the server.

A process of translating a destination address (reverse translation) in the address translating apparatus 100a at the time a response packet representative of a processed result is transmitted from the server 21 to the client 12 will be described below.

Figure 22:
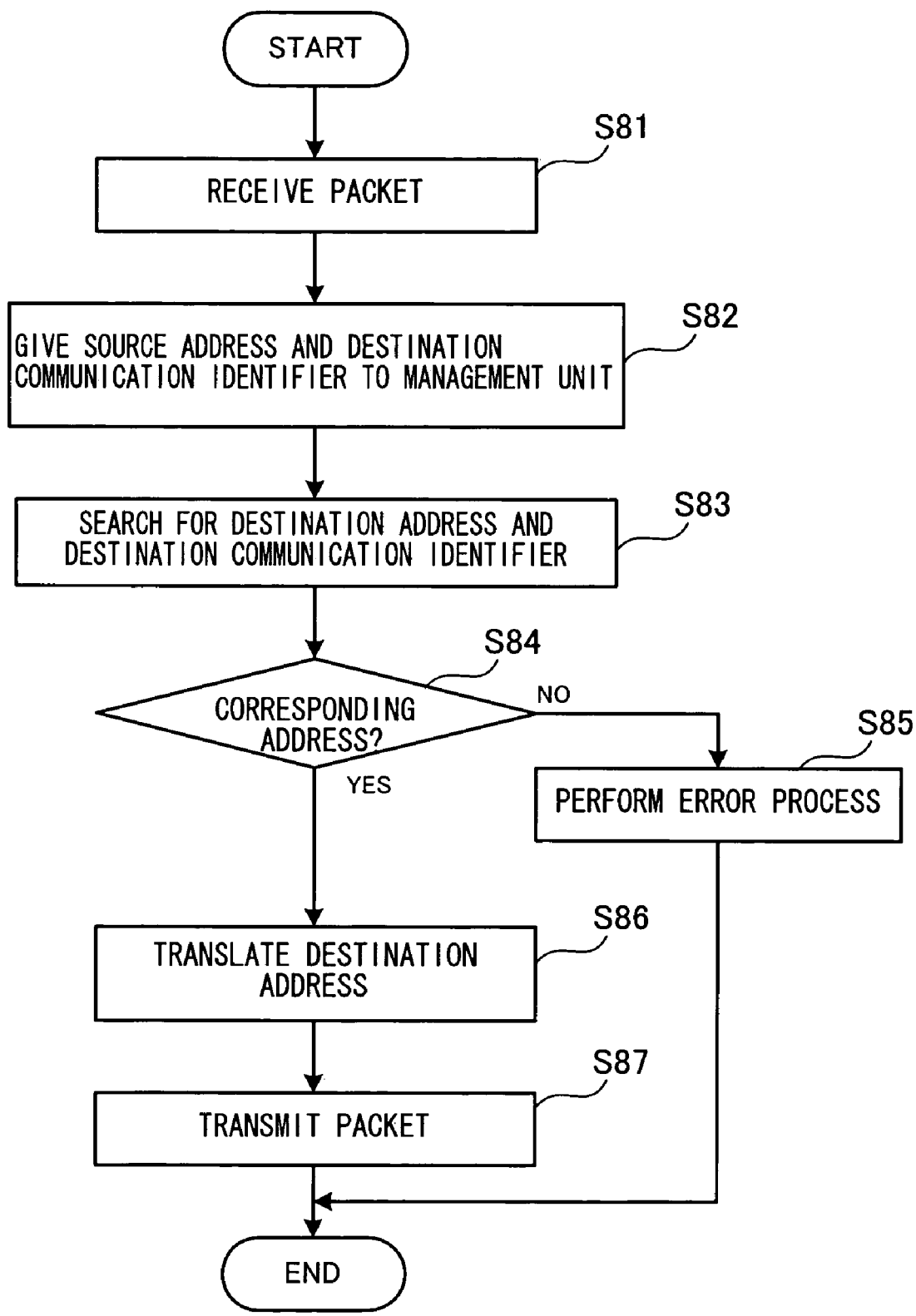
FIG. 22 is a flowchart of a processing sequence for translating the address of a response packet according to the third embodiment.

FIG. 22 shows a processing sequence for translating the address of a response packet according to the third embodiment. The processing sequence shown in FIG. 22 will be described below in the order of step numbers shown therein.

[STEP S81] The communication unit 110 receives the packet sent from the server 21, and gives the received packet to the reverse address translator 140.

[STEP S82] The reverse address translator 140 gives the destination address and the destination communication identifier of the received packet to the management unit 150.

[STEP S83] The management unit 150 searches the management table 151b for a record of a source address that is translated and a source communication identifier that is translated which are in conformity with the set of the destination address and the destination communication identifier received from the reverse address translator 140. The management unit 150 returns the source address to be translated and the source communication identifier to be translated in the record that is found, to the reverse address translator 140. If there is no record found, then the management unit 150 returns information (e.g., "null") indicating that there is no corresponding record.

[STEP S84] The reverse address translator 140 determines whether a corresponding record is found or not. If a corresponding record is found, then control goes to STEP S86. If no corresponding record is found, then control goes to STEP S85.

[STEP S85] The reverse address translator 140 performs an error process, after which the processing sequence is ended.

[STEP S86] The reverse address translator 140 translates the destination address of the packet received from the communication unit 110 into the source address to be translated which is returned from the management unit 150, and gives the address-translated packet to the communication unit 110.

[STEP S87] The communication unit 110 transmits the packet received from the reverse address translator 140 to the proxy server 31.

A specific example of the address translation performed by the address translating apparatus 100b will be described below.

Figure 23:
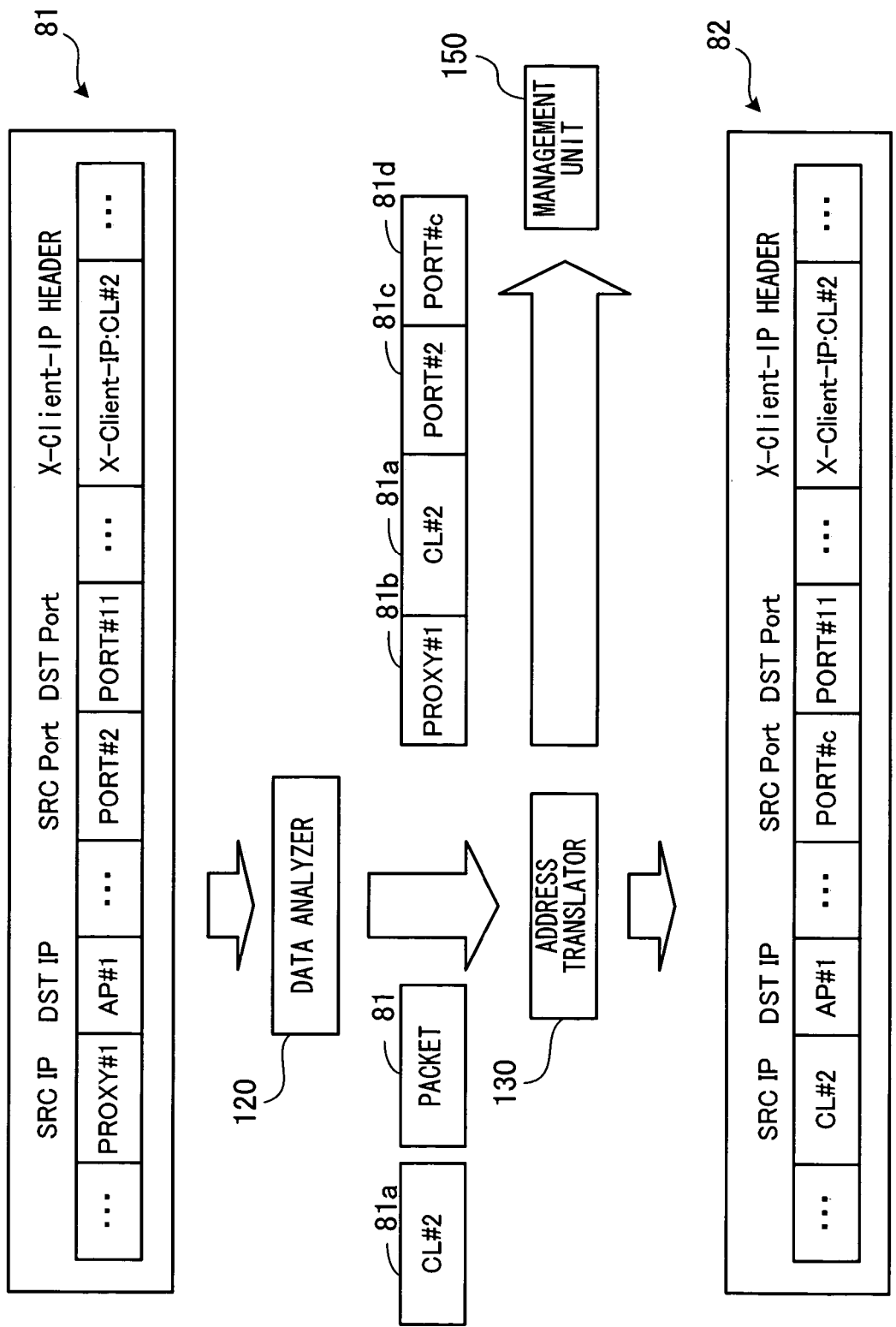
FIG. 23 is a diagram showing an example of the translation of the address of a processing request packet.

FIG. 23 shows an example of the translation of the address of a processing request packet. A packet 81 that input to the address translating apparatus 100b via the proxy server 31 has a source IP address (SRC IP) "PROXY#1", a destination IP address (DST IP) "AP#1", a source communication identifier (SRC Port) "PORT#2", a destination communication identifier (DST Port) "PORT#11", and an X-Client-IP header "X-Client-IP: CL#2".

When the packet 81 is supplied to the address translating apparatus 100b, the data analyzer 120 analyzes the contents of the X-Client-IP header and acquires the address 81a (CL#2) of the client 12. The address 81a of the client 12 and the packet 81 are given to the address translator 130.

The address translator 130 uniquely generates a communication identifier "PORT#c", and also generates a packet 82 wherein the source address and the source communication identifier have been translated. The packet 82 is translated via the communication unit 110 to the server 21. In the packet 82, the source IP address (SRC IP) is translated into "CL#2", the source communication identifier (SRC Port) is translated into "PORT#c", and other information remains unchanged.

The address translator 130 gives the source address 81b "PROXY#1" to be translated, the address 81a "CL#2" of the client 12, the source communication identifier 81c "PORT#2" to be translated, and the source communication identifier 81d "PORT#c" that is translated to the management unit 150, which adds the set of the addresses as a new record to the management table 151b.

Figure 24:
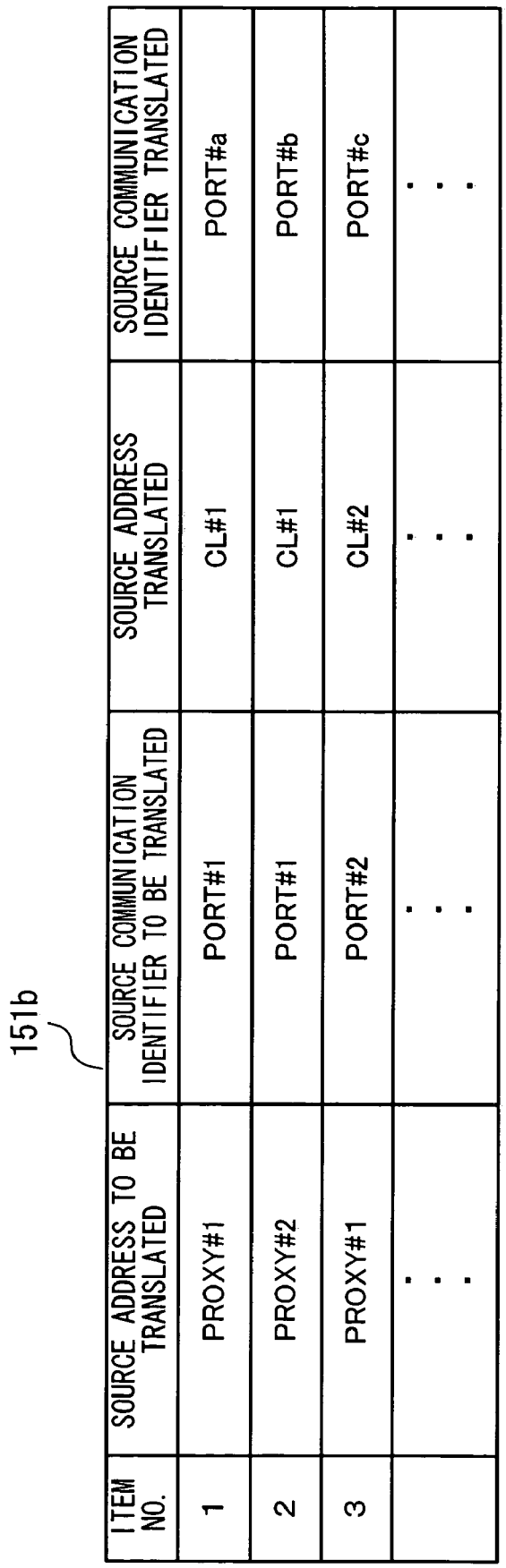
FIG. 24 is a diagram showing a management table after a record has been added thereto.

FIG. 24 shows the management table 151b after a record has been added thereto. As shown in FIG. 24, the source packet "PROXY#1#, the source communication identifier "PORT#2", and the address "CL#2" of the client that is registered in the X-Client-IP header are read from the packet 81 shown in FIG. 23, and registered respectively as the source address to be translated, the source communication identifier to be translated, and the source address that is translated in the management table 151b. Furthermore, the newly generated unique communication identifier "PORT#c" is registered as the source communication identifier that is translated in the management table 151b.

Figure 25:
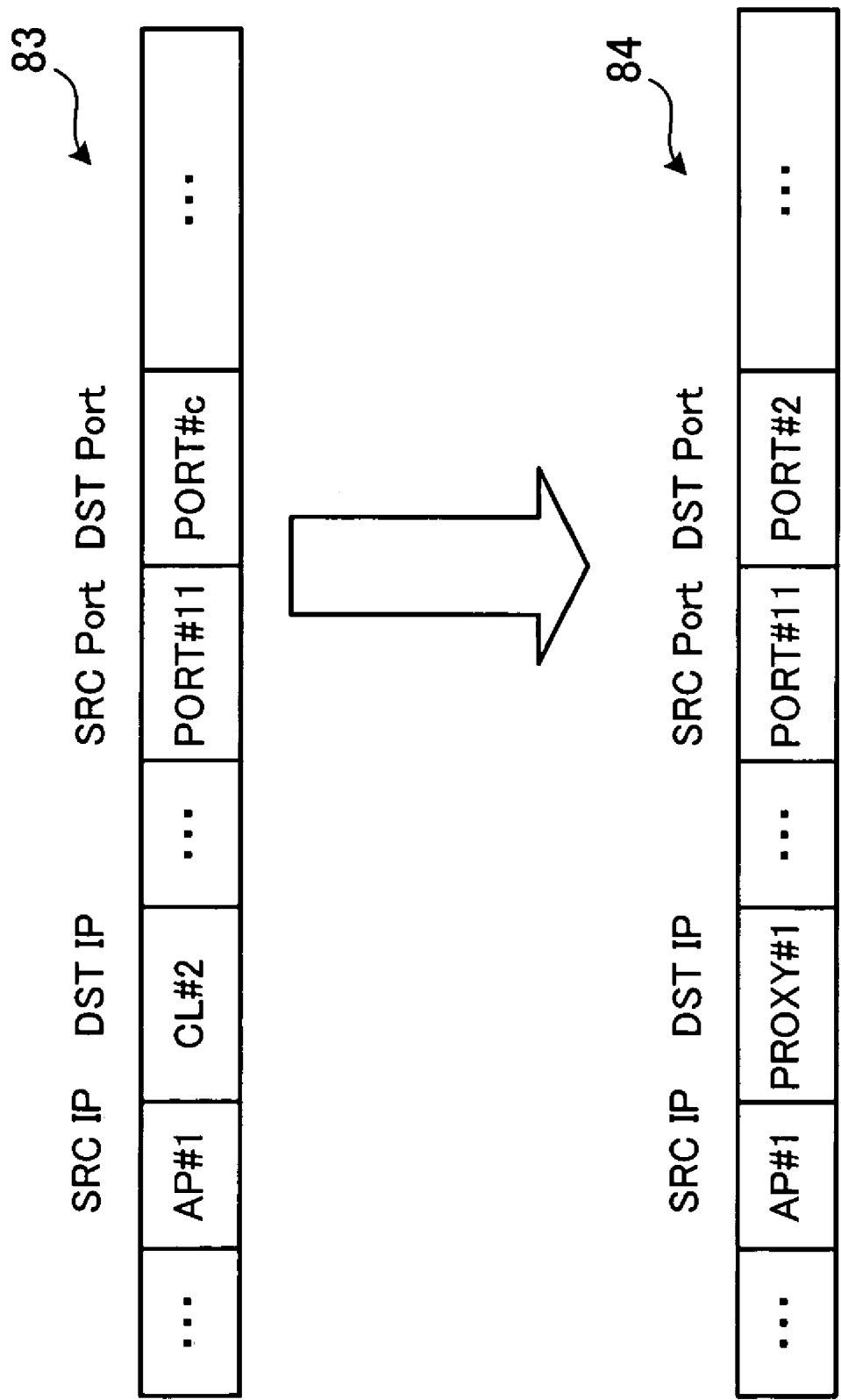
FIG. 25 is a diagram showing an example of the translation of the address of a response packet.

FIG. 25 shows an example of the translation of the address of a response packet. As shown in FIG. 25, a packet 83 that is input as a response from the server 21 to the address translating apparatus 100b has a source IP address (SRC IP) "AP#1", a destination IP address (DST IP) "CL#2" a source communication identifier (SRC Port) "PORT#11", and a destination communication identifier (DST Port) "PORT#c". When the packet 83 is supplied to the address translating apparatus 100b, the address translating apparatus 100b generates a packet 84 where the source address has been translated, and transmits the packet 84 to the proxy server 31. In the packet 84, the source IP address (SRC IP) is translated into "PROXY#1", the destination communication identifier (DST Port) is translated into "PORT#2#, and other information remains unchanged.

In the manner described above, even if the load distributing apparatus distributes a request packet to either one of the proxy servers 31, 32, 33, a response packet can be returned to the proxy server which has relayed the request packet. Specifically, according to the third embodiment, a unique communication identifier is set with respect to a request packet, and a source address to be translated (the address of a proxy server which has relayed the request packet), a source address that is translated, and a communication identifier to be translated are stored in association with the unique communication identifier. Therefore, the address of the proxy server which has relayed the request packet corresponding to the response packet can be recognized based on the source address to be translated which is associated with the destination communication identifier of the response packet from the server.

4th Embodiment

A fourth embodiment of the present invention will be described below. According to the fourth embodiment, a proxy server function is installed in an address translating apparatus.

Figure 26:
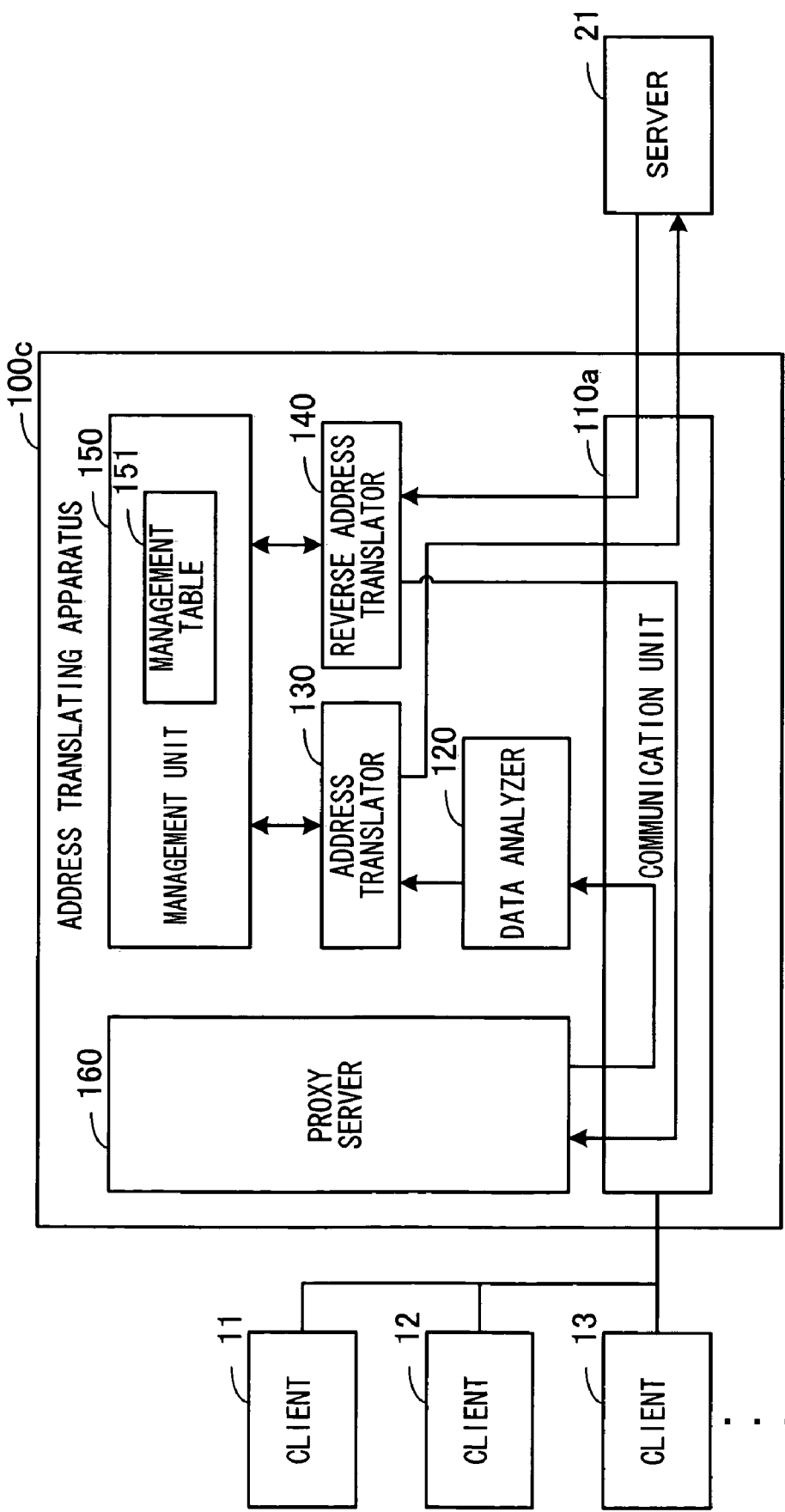
FIG. 26 is a view showing a system arrangement for realizing a fourth embodiment of the present invention.
Figure 27:
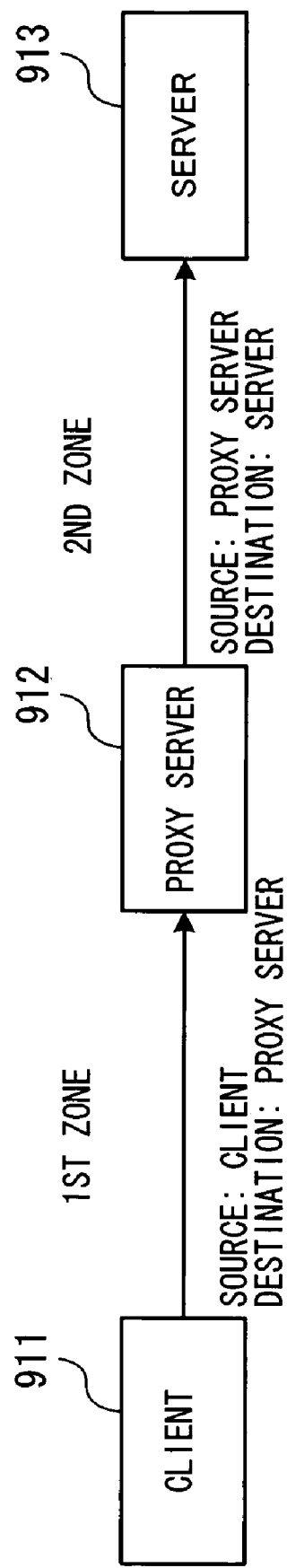
FIG. 27 is a block diagram showing a first example of a communication session via a conventional proxy server.
Figure 28:
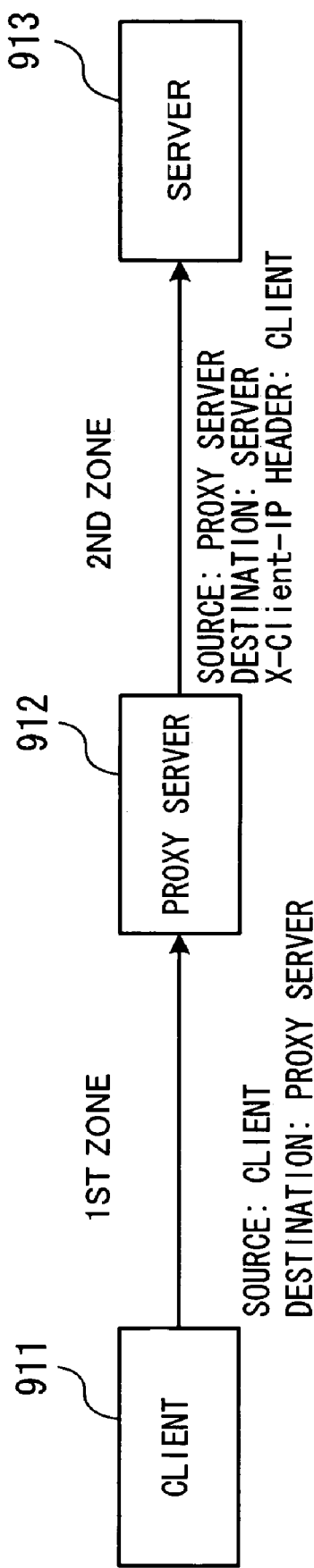
FIG. 28 is a block diagram showing a second example of a communication session via a conventional proxy server.

FIG. 26 shows a system arrangement for realizing the fourth embodiment of the present invention. As shown in FIG. 26, an address translating apparatus 100c has a communication unit 110a, a data analyzer 120, an address translator 130, a reverse address translator 140, a management unit 150, and a proxy server 160. The data analyzer 120, the address translator 130, the reverse address translator 140, and the management unit 150 have the same functions as the components entitled identically thereto according to the first embodiment shown in FIG. 4.

The proxy server 160 has the same function as the proxy server 31 according to the first embodiment. However, the proxy server 160 receives a packet transmitted to and received from the clients 11, 12, 13, . . . via the communication unit 110a.

The communication unit 110a has the same function as the communication unit 110 according to the first embodiment. However, since the proxy server 160 is in the same apparatus as the communication unit 110a, the communication unit 110a transmits packets to and receives packets from the proxy server 160 not via a network. For example, when the communication unit 110a receives a packet from the clients 11, 12, 13, . . . and the reverse address translator 140, the communication unit 110a gives the packet directly to the proxy server 160. If a packet output from the proxy server 160 is a request packet destined for the server 31, then the communication unit 110a gives the packet to the data analyzer 120. If a packet output from the proxy server 160 is a response packet in response to a request packet, then communication unit 110a transmits the packet to the clients 11, 12, 13, . . . .

The function of the address translating apparatus can be installed in the same apparatus as the servers 21, 22, 23.

According to the embodiments of the present invention, as described above, the address translating apparatus translates the source address in a packet from the address of a proxy server into the address of a client which is a source, and sends the packet to a server. Therefore, the server is not required to analyze application data and extract the address of the client stored therein. Since the server does not need to perform such processing, it is not necessary for the server to recognize and separately process an access transmitted via the proxy server and an access transmitted not via the proxy server. Consequently, the server function can easily be constructed.

The above processing functions can be performed by a computer. In this case, an address translating program that is descriptive of the processing contents of the functions that are to be owned by the address translating apparatus is provided. In response to a request from a client computer, a server computer executes the address translating program. The processing functions are now realized by the server computer, and processed results are sent from the server computer to the client computer.

The address translating program that is descriptive of the processing contents may be recorded on a recording medium that can be read by the server computer. The recording medium that can be read by the server computer may comprise a magnetic recording device, an optical disk, a magneto-optical recording medium, a semiconductor memory, or the like. The magnetic recording device may be a hard disk drive (HDD), a flexible disk (FD), a magnetic tape, or the like. The optical disk may be a DVD (Digital Versatile Disc), DVD-RAM (Random Access Memory), CD-ROM (Compact Disc Read Only Memory), a CD-R (Recordable)/RW (ReWritable), or the like. The magneto-optical recording medium may be an MO (Magneto-Optical) disk.

For distributing the address translating program, portable recording mediums such as DVDs, CD-ROMs, etc. in which the address translating program is recorded are sold. The server computer which executes the address translating program stores, in its own memory device, the address translating program that is recorded on a portable recording medium. The server computer then reads the address translating program from its own memory device, and performs a processing sequence according to the address translating program. The server computer may directly read the address translating program from the portable recording medium and perform a processing sequence according to the address translating program.

According to the present invention, as described above, the source address of a request packet transmitted via a proxy server is translated from the address of the proxy server into the address of a client, and the address-translated request packet is transmitted to a server. Then, an address of a response packet from the server is translated in reverse. Therefore, it is possible to provide a service wherein the address of a client is specified, without the need for any special processing for analyzing the address of the client in the server.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for translating an address of a packet transmitted and received between a client and a server which are connected to each other through a proxy server, the method comprising:

receiving a request packet, which has a source address translated into the address of said proxy server, output from said client to said server via said proxy server, and analyzing contents of said request packet to acquire the address of said client;

translating said source address of said request packet into the acquired address of said client and transmitting said request packet to said server;

receiving a response packet in response to said request packet from said server, translating a destination address of said response packet from the address of said client into the address of said proxy server, and transmitting said response packet to said proxy server;

after the address of said client is acquired, generating a communication identifier capable of uniquely identifying said request packet;

translating a source communication identifier of said request packet into the generated communication identifier, at the same time that the source address of said request packet is translated;

when the source address of said request packet and said communication identifier are translated, storing contents of said source address and said source communication identifier that are to be translated and contents of said source address and said source communication identifier that are translated, in association with each other in a database; and when said response packet is received, referring to said database to determine the address of said client to be set as said destination address, and translating a destination communication identifier of said response packet into said source communication identifier to be translated which is registered in said database.

2. The method according to claim 1, further comprising:
for changing said source address of said request packet, acquiring the address of said proxy server from a storage area in which the address of said proxy server is registered in advance.

3. The method according to claim 1, further comprising:
when said source address of said request packet is translated, storing the address of said proxy server set as said source address to be translated and the address of said client set as said source address that is translated, in association with each other in a database;
when said response packet is received, referring to said database to determine the address of said client to be set as said destination address.

4. The method according to claim 1, wherein the address of said client is acquired from an application header in said request packet.

5. An address translating method for translating an address of a packet transmitted and received between a client and a server which are connected to each other through a proxy server, said address translating method comprising the steps of:

receiving a request packet, which has a source address translated into the address of said proxy server, output from said client to said server via said proxy server, and analyzing contents of said request packet to acquire the address of said client;

translating said source address of said request packet into the acquired address of said client and transmitting said request packet to said server; and receiving a response packet in response to said request packet from said server, translating a destination address of said response packet from the address of said client into the address of said proxy server, and transmitting said response packet to said proxy server;

after the address of said client is acquired, generating a communication identifier capable of uniquely identifying said request packet;

translating a source communication identifier of said request packet into the generated communication identifier, at the same time that the source address of said request packet is translated;

when the source address of said request packet and said communication identifier are translated, storing contents of said source address and said source communication identifier that are to be translated and contents of said source address and said source communication identifier that are translated, in association with each other in a database; and when said response racket is received, referring to said database to determine the address of said client to be set as said destination address, and translating a destination communication identifier of said response packet into said source communication identifier to be translated which is registered in said database.

6. An address translating apparatus for translating an address of a packet transmitted and received between a client and a server which are connected to each other through a proxy server, said address translating apparatus comprising:

client address acquiring means for receiving a request packet, which has a source address translated into the address of said proxy server, output from said client to said server via said proxy server, and analyzing contents of said request packet to acquire the address of said client;

source address translating means for translating said source address of said request packet into the acquired address of said client and transmitting said request packet to said server; and destination address translating means for receiving a response packet in response to said request packet from said server, translating a destination address of said response packet from the address of said client into the address of said proxy server, and transmitting said response packet to said proxy server;

wherein said source address translating means generates a communication identifier capable of uniquely identifying said request packet, translates a source communication identifier of said request packet into the generated communication identifier, and stores contents of said source address and said source communication identifier that are to be translated and contents of said source address and said source communication identifier that are translated, in association with each other in a database: and wherein said destination address translating means refers to said database to determine the address of said client to be set as said destination address, and translates a destination communication identifier of said response packet into said source communication identifier to be translated which is registered in said database.

7. A computer-readable recording medium recording therein an address translating program for translating an address of a packet transmitted and received between a client and a server which are connected to each other through a proxy server, said address translating program enabling a computer to perform a process of:

receiving a request packet, which has a source address translated into the address of said proxy server, output from said client to said server via said proxy server, and analyzing contents of said request packet to acquire the address of said client;

translating said source address of said request packet into the acquired address of said client and transmitting said request packet to said server;

receiving a response packet in response to said request packet from said server, translating a destination address of said response packet from the address of said client into the address of said proxy server, and transmitting said response packet to said proxy server; after the address of said client is acquired, generating a communication identifier capable of uniquely identifying said request packet;

translating a source communication identifier of said request packet into the generated communication identifier, at the same time that the source address of said request packet is translated; and when said response packet is received, referring to a database to determine the address of said client to be set as said destination address, and translating a destination communication identifier of said response packet into said source communication identifier to be translated which is registered in said data base.

8. The computer-readable recording medium according to claim 7, wherein said address translating program enabling a computer to further perform a process of:

when the source address of said request packet and said communication identifier are translated, storing contents of said source address and said source communication identifier that are to be translated and contents of said source address and said source communication identifier that are translated, in association with each other in the database.

* * * * *